United States Patent
Goebel

(10) Patent No.: US 12,142,806 B2
(45) Date of Patent: Nov. 12, 2024

(54) APPARATUS RADIATING AND RECEIVING MICROWAVES, RADAR APPARATUS COMPRISING SUCH AN APPARATUS, AND METHOD FOR ASSEMBLING SUCH AN APPARATUS

(71) Applicant: Uhland Goebel, Senden (DE)

(72) Inventor: Uhland Goebel, Senden (DE)

( * ) Notice: Subject to any disclaimer, the term of this patent is extended or adjusted under 35 U.S.C. 154(b) by 469 days.

(21) Appl. No.: 17/611,052

(22) PCT Filed: May 12, 2020

(86) PCT No.: PCT/EP2020/063183
§ 371 (c)(1),
(2) Date: Nov. 12, 2021

(87) PCT Pub. No.: WO2020/229464
PCT Pub. Date: Nov. 19, 2020

(65) Prior Publication Data
US 2022/0238978 A1    Jul. 28, 2022

(30) Foreign Application Priority Data
May 14, 2019   (EP) ..................................... 19000232

(51) Int. Cl.
*H01Q 9/04* (2006.01)
*G01S 7/03* (2006.01)
(Continued)

(52) U.S. Cl.
CPC ................ *H01P 5/022* (2013.01); *G01S 7/03* (2013.01); *G01S 13/88* (2013.01)

(58) Field of Classification Search
CPC .......... G01S 13/88; G01S 13/931; G01S 7/03; H01P 5/02; H01P 5/022; B29C 65/00;
(Continued)

(56) References Cited

U.S. PATENT DOCUMENTS 6,881,369 B2 * 4/2005 Lee ........................... G03F 7/00
                                                          205/70
8,871,355 B1 * 10/2014 Mears .................... B22F 3/1021
                                                          428/553
(Continued)

FOREIGN PATENT DOCUMENTS

| EP | 3 032 655 A1 | 6/2016 |
| WO | 01/89038 A2 | 11/2001 |
| WO | 2004/039135 A1 | 5/2004 |

OTHER PUBLICATIONS

International Search Report with Written Opinion for related Application No. PCT/EP2020/063183 dated Jul. 15, 2020 (9 Pages).

*Primary Examiner* — Tho G Phan
(74) *Attorney, Agent, or Firm* — Michael Best & Friedrich LLP

(57) ABSTRACT

An apparatus at least comprising a first contact partner which has a first metal contact surface, a 3-dimensional injection molded layer serving as second contact partner which has a second metal contact surface, and which comprises a synthetic injection-moldable material, and a plurality of deformable microstructures being situated between said first contact partner and said second contact partner. Said deformable microstructures are serving as electric pressure contacts which electrically connect said first metal contact surface and said second metal contact surface after having assembled said first contact partner and said second contact partner. Said apparatus comprises an electrically isolating bonding agent, preferably an electrically isolating bonding agent comprising a polymeric material or a polymeric-based compound material. Said bonding agent being situated between said first contact partner and said second contact partner.

27 Claims, 19 Drawing Sheets

(51) Int. Cl.
*G01S 13/88* (2006.01)
*H01P 5/02* (2006.01)

(58) Field of Classification Search
CPC .. B29C 65/02; B32B 9/00; B32B 9/04; B32B 27/04
See application file for complete search history.

(56) References Cited

U.S. PATENT DOCUMENTS

| | | | |
|---|---|---|---|
| 10,886,624 B2 * | 1/2021 | Wälde | G01B 15/04 |
| 11,552,411 B2 * | 1/2023 | Johansson | H01Q 9/045 |
| 11,729,908 B2 * | 8/2023 | Kim | H05K 3/182 |
| | | | 343/893 |
| 2004/0252477 A1 | 12/2004 | Brown et al. | |

* cited by examiner

APPARATUS RADIATING AND RECEIVING MICROWAVES, RADAR APPARATUS COMPRISING SUCH AN APPARATUS, AND METHOD FOR ASSEMBLING SUCH AN APPARATUS

FIELD OF THE INVENTION

The present invention concerns an apparatus for radiating and receiving electromagnetic microwaves. It further concerns a radar apparatus which comprises at least one such apparatus and a method for assembling such an apparatus.

BACKGROUND

Waveguides are commonly employed media for the propagation of electromagnetic microwaves. Waveguides are hollow conductive conduits which typically have a rectangular or circular cross section designed to propagate microwaves with a minimum of loss. Waveguides might include ridged structures within a waveguide conduit to change the propagation characteristics of the waveguides and to adapt them for particular applications. Single-ridge and double-ridge waveguides are widely used.

Antenna elements are used in order to radiate and/or receive microwaves. Antenna elements include horn antennas (e.g. a rectangular waveguide horn), patch- or stub-like microstripline-based antennas (e.g. a SFPA (Serially-Fed Patch Array) antenna, serially fed antennas (e.g. having combline or grid topology) and 2-dimensional arrays of such antennas) and slot-based antennas. All of these elements and groups of elements are used to emit and direct microwaves into a well-defined beam propagation direction, with a well-defined radiation pattern.

SFPA antennas, for example, are in wide use for current MIMO- and Virtual Array radar sensors. They are based on microstrip transmission lines and can be conveniently produced in a standard PCB (printed circuit board) fabrication process. Alternative feeding network topologies like power-divider based parallel or combined parallel-serial feeding schemes are also in wide use for microstrip-based and patch arrays.

An alternative to patch- or stub-like microstripline-based antennas are slot arrays. Here, a certain area of an electrically conducting plane, which extends beyond the intended overall radiating aperture, is locally interrupted by slots, which can assume different shapes but are typically tuned to a resonance frequency close to the center of the desired frequency band of operation. By proper arrangement and coherent excitation, these slots can provide very similar transmit- and receive characteristics as compared to patch- or stub type radiators.

Radiating slots can be either backed by a (resonant) cavity or arranged as an array along a feeding waveguide. If few slots are sharing a cavity, they might share a single waveguide port, too. Such arrangements are useful as subarrays, each representing a single channel of modern multiple input/multiple output (MIMO) radar sensors, and enables a 2-dimensional electronic beam control with high angular resolution. Serially fed slot arrays (typically arranged in a straight line) are often combined in laterally arranged groups to define flat, 2-dimensional arrays that can be electronically scanned at least in one cardinal plane (e.g. the horizontal or azimuth plane).

Typically, a waveguide is coupled to an antenna element in order to feed the antenna or in order to guide received microwaves towards a subsequent signal processing circuitry. In order to connect certain of the planar antenna elements (like SFPA and combline antennas), microstrip lines are the most convenient option.

In order to be able to realize modern, powerful microwave apparatus (e.g. radar apparatus for automotive use) hybrid solutions are of interest, where at least two different material layers need to be combined. This results from the fact, that different signal transmission media (e.g. microstrip and waveguide) need to be combined and are based on different material technologies. The ever-increasing apparatus complexity as well as the continuously growing packing density of antenna elements, signal ports and signal lines result in an increasingly challenging and crucial signal routing task.

Often, signal underpasses, crossings, transitions between the different material layers and coupling apertures between waveguides are required to realize modern, powerful microwave apparatus. The higher the channel count gets, the more difficult it is to find a collision-free (quasi-planar) routing for all required HF signal interconnects.

Due to the different preferred chip package styles in use historically and dependent on the fractional market volume for certain types of radar sensors as well as the production technologies available and established at different radar manufacturers, it is necessary to couple different types of media for the propagation of microwaves in hybrid systems. The general market trend is pointing towards significantly increased angular resolution, while at the same time the cost must be reduced further. In addition, the front-side real estate available for any radar sensor on the exterior of a car is very limited, which asks for significant overall size reduction.

Wafer-level packaging such as eWLB (expanded wafer level ball grid, e.g. with 0.4 mm or 0.5 mm pitch) offer high circuit/port density. This needs to be complimented with a multi-channel signal distribution network as e.g. required for MIMO and virtual array antennas, which shall have as low as possible signal insertion loss. This connects the SMT-mounted active components to large numbers of reduced-size, individually excited radiator elements. A typical example for upcoming channel counts is 16, 24 or 48 transmit channels and an equivalent number of receive channels, integrated into a compact 77 GHz radar sensor occupying less than 100 cm$^2$ radome front area.

It is important to be able to provide suitable, versatile transitions between a (radar) chip set and a signal distribution network on one end, and on the other end to a set of antennas. The signal distribution network needs to offer low loss, compactness and routing versatility. Waveguides, e.g. ridged waveguide conduits, are a very attractive (low loss) option for signal distribution, but too expensive and bulky when fabricated in conventional techniques, e.g. from milled metal blocks.

Typically, the design of hybrid microwave systems is difficult due to the very different nature of the conventionally employed antenna elements (as outlined above), waveguide conduits, and other signal lines. The routing of the HF signal paths is one of the key issues if a densely packed, robust design of a hybrid microwave system is required.

SUMMARY

It is an objective within the scope of this document, to provide for a hybrid apparatus with at least two different material layers and with a flexible and versatile interfacing technology.

It is a further objective within the scope of this document, to achieve a simple, effective and tolerance-insensitive electrical and mechanical connection of at least two different material layers.

It is an additional objective within the scope of this document, to make an as effective as possible use of every single piece part, e.g. use structures in one 3D molded part for two independent layers of signal distribution.

It is a further objective within the scope of this document, to simplify certain other piece parts used in combination with aforementioned parts, e.g. by reduction to 2D topologies.

It is a further objective within the scope of this document, to detach large parts of the signal distribution network from the system PCB, thereby freeing up surface area for SMT component and device placement.

It is a further objective within the scope of this document, to provide a reliable assembly process for the series production of such an apparatus and for incorporating such apparatus into the system housing, while achieving a reliable connection and mechanical joint to signal generation and processing subsystems (e.g. residing on a system PCB).

It is a further objective within the scope of this document, to provide an assembly process which ensures a reliable electrical (short-circuit) connection between two different material layers, which ensures a robust fixation of the two layers and which enables an accurate alignment of elements/features carried by these layers.

These objectives are being solved by an apparatus in accordance with claim 1, a radar apparatus in accordance with claim 24, and by a method in accordance with claim 26.

Advantageous improvements can be derived from the dependent claims and the below description.

In accordance with at least some embodiments, a hybrid (microwave or radar) apparatus is provided which at least comprises
- a first contact partner which has
  - a first metal contact surface being essentially flat,
- a 3-dimensional injection molded layer serving as second contact partner which has
  - a second metal contact surface, and
  - which comprises a synthetic injection-moldable material,
and which comprises
- a plurality of deformable microstructures serving as electric pressure contacts
  - when assembling said first contact partner and said second contact partner, and wherein said apparatus comprises an electrically isolating bonding agent being situated between said first contact partner and said second contact partner.

The bonding agent, which is comprised in all embodiments, is a non-conductive bonding agent. This bonding agent is thus referred to as electrically isolating bonding agent. That is, the bonding agent is based on a synthetic material which does neither exhibit intrinsic electrical conductivity nor contain any conductive particles or additives. The bonding agent is used during the assembly process when the two contact partners are joined together. Its main purpose is the mechanical fixation or bonding of these two contact partners.

The terms "non-conductive" or "electrically isolating" are herein used to emphasize that a layer which comprises the hardened or cured bonding agent does not show any electric conductivity on the macroscopic level. That is, there only is an electric conductivity between the first metal contact surface and the second metal contact surface provided by the deformable microstructures as such.

Likewise, the bonding agent, which is used in connection with all embodiments, can be characterized as follows. This bonding agent comprises a dielectric material which has a dielectric constant ε which is greater than 2.5. Preferably, the dielectric constant ε is in the range between 2.8 and 4.5. The term "dielectric bonding agent" can herein be used as synonym for the "non-conductive bonding agent" and for the "electrically isolating bonding agent".

The bonding agent of at least some embodiments comprises one or more of the following materials: 1-component or 2-component Epoxy resins, 2-component Acrylates and Polyurethanes, Cyanoacrylates. Preferably, a polymeric material or a polymeric-based compound material serves as bonding agent in all embodiments.

The bonding agent of at least some embodiments is designed for temperature induced curing and/or UV induced curing. 1-component- or 2-component-bonding agents can be used. Of special advantage are adhesive systems, which can cure at low temperatures or even room temperature, e.g. UV-/light activated adhesives, based on epoxy resins and/or Acrylates. Further hardening/cross-linking of such polymers can often be achieved by a thermal secondary treatment, e.g. in an in-line oven process only requiring moderate temperatures It is an advantage of the structures and method of joining and contacting proposed herein, that the absence of conductive fillers or particles in the bonding agents allows for a very broad choice of adhesive systems suitable for the application, and significant cost savings. The viscosity of uncured adhesive can be chosen/optimized for the application process and for optimized wetting/spreading in the joining structures described herein. Thus, optimum adhesion and strength of the bond line can be achieved; (air) bubble formation and uncontrolled shrinkage while hardening or curing can be avoided.

It is a further advantage of some of the mentioned 1-component bonding agents, that they can be processed by spray heads or by the nozzles of an inkjet apparatus. That is, the bonding agent can be applied in precise quantities to the respective surface of one or both contact partners before these two contact partners are joined and before uniaxial pressure is applied.

It is a further advantage of the use of such a bonding agent that the assembly and curing can be carried out at low temperatures, preferably at temperatures below 150° C., and even at room temperature. This helps to reduce incorporated mechanical stress, piece parts deformation and metal adhesion failure on joint interfaces.

It is a further advantage of the use of such a bonding agent that during the assembly process a positive substance bonding between the two contact partners is obtained. After the assembly process, the apparatus, which comprises two positively substance bonded contact partners, is significantly more temperature resistant and shock-proof than e.g. press-mated or screw-fitted parts.

It is an advantage of the gap-filling (capillary) effect of such bonding agents, that extreme accuracies of piece-part dimensions and position registration—as e.g. required for pressed-in tongue- and groove connections—can be avoided, as well as the compressive stress and strain associated with press-mated parts.

In at least some embodiments, the assembly process comprises a preparatory step for the application of the bonding agent to the respective surface or surfaces of one or both contact partners. In this preparatory step, the bonding agent might be applied by an inkjet apparatus, for example, or it might be applied by means of a screen- or pad printing process.

In at least some embodiments, the assembly process comprises a preparatory step for the application of the bonding agent so that all of the surface or surfaces is/are covered.

In at least some embodiments, the assembly process comprises a preparatory step for the selective application of the bonding agent so that only portions of the surface or surfaces is/are covered. When using an inkjet apparatus, for example, the bonding agent deposits can be arranged in full circles around each of the deformable microstructures, in shallow grooves and on top of elevated zones, in order to guarantee a complete, void-free gap filling.

It is another advantage of the structures and method of joining and contacting proposed herein, that over-spraying, dripping, scattering or blooming of uncured bonding agent are merely an issue for performance and yield of the fabricated apparatus, due to the pure dielectric properties of cured non-conducting bonding agent.

In at least some embodiments, the apparatus further comprises between said first contact partner and said second contact partner
- limit stop structures defining a relative stop position when assembling said first contact partner and said second contact partner, and/or
- 3-dimensional engaging structures comprising a first portion being situated on or in said first contact partner and a second portion being situated on or in said second contact partner, wherein said first portion engages with said second portion when assembling said first contact partner and said second contact partner.

In at least some embodiments, the apparatus comprises a plurality of deformable microstructures and limit stop structures.

The apparatus of at least some embodiments can be used as part of a multilayer semi-planar antenna for receiving and/or transmitting high-frequency (HF) signals, such as radar signals.

The apparatus of at least some embodiments is designed as multilayer antenna comprising at least one metal layer with a metal contact surface and one injection molded layer with a metal(lized) contact surface, wherein during an assembly process the metal contact surface and the metal (lized) contact surface are uniaxially pressed against each other.

For enabling the lowest possible cost of antenna subsystem production and integration, the piece-part count of at least some embodiments is low, e.g. requiring only 1 or 2 metallized injection molded plastic parts and 1 or 2 metal sheets for the whole antenna subsystem of a radar sensor.

The apparatus of at least some embodiments is providing a number of advantages, when used as purposefully arranged antenna building blocks in advanced radar sensors, e.g. for automotive and for industrial sensing applications.

The apparatus of at least some embodiments may be designed for use in radar applications in a frequency range between 20 GHz and 1 THz. The embodiments presented herein may be designed more specifically for use in a frequency range between 60 GHz and 120 GHz. The abbreviation HF and the word "microwave" (both are used herein as quasi synonyms) are meant to cover the broad frequency range between 3 MHz and 1 THz, notwithstanding the fact that in the pertinent art this abbreviation and this term are associated with other frequency ranges.

Advances in fabrication technology, like metallized plastics for 3D components and roll-to-roll metal foil processing (by etching, laser-cutting, galvanic plating etc.), and in CAD/CAE methods with full-wave analysis based design flows, open a number of new opportunities used herein. Specifically, metallized plastics piece part production allow high accuracy and reproducibility to the single micrometer tolerance range, as does precision etching and plating of metal sheet or foil. These technologies are thus used in some of the embodiments presented herein.

It is an advantage of at least some embodiments that it is possible to employ either: a metal sheet, a metal foil, a bulk metal part or metallized plastics piece part to provide for the basic antenna functions.

In accordance with at least some embodiments, an apparatus is provided which is based on a modular concept. Each apparatus comprises two or more than two different material layers (contact partners) so as to realize an antenna subsystem or an antenna.

The combination of two or more than two material layers (contact partners) facilitates the construction of radiator groups while keeping a close eye on the beam shaping characteristics.

The embodiments proposed herein have a number of advantages as far as their system integration is concerned. The respective elements have a small footprint and quite some flexibility is offered regarding the signal routing.

It is an advantage of at least some embodiments of the apparatus that their semi-planar configuration has a total thickness of less than 1.5 mm, for use in automotive radar frequency range 76 GHz to 81 GHz.

At least some of the embodiments comprise a metal layer serving as first contact partner. In these embodiments, the first metal contact surface is an integral part of the metal layer, and the metal layer comprises a 2D-structure extending through the metal layer.

At least some of the embodiments comprise at least one HF signal port. Such an HF signal port might be realized by a passing aperture inside one of the contact partners and/or by a conductive metal line (e.g. a microstrip transmission line element) defined in one of the metal contact surfaces.

At least some of the embodiments comprise a rectangular or circular waveguide-shaped HF signal port in a bulk metal plate serving as first contact partner. Such an embodiment can be used as part of a radar or communication system, for example.

At least some of the embodiments comprise a single waveguide duct emanating from (every) HF signal port P1. The first antenna embodiment presented herein, the second antenna embodiment, the third antenna embodiment and the seventh antenna embodiment might comprise such a single waveguide duct emanating from (every) HF signal port.

At least some of the embodiments comprise a pair of waveguide ducts emanating from (every) HF signal port and extending into opposite directions. The fourth antenna embodiment, the fifth antenna embodiment, the sixth, the eighth the ninth and the eleventh antenna embodiment might comprise a pair of waveguide ducts emanating from (every) HF signal port.

At least some of the embodiments provide for a choice of implementing a single or a pair of waveguide ducts emanating from (every) HF signal port. The first antenna embodiment, the second antenna embodiment and the seventh antenna embodiment can optionally be provided with two waveguide ducts emanating from (every) HF signal port. The fourth, fifth, sixth, eighth, ninth and eleventh antenna embodiment can be easily provided with a single waveguide duct emanating from (every) HF signal port, instead of the pair of waveguide ducts mentioned before.

At least some of the embodiments allow connecting varying numbers (one, two and more) waveguide ducts to (every) HF signal port indirectly, as elaborated for the tenth antenna embodiment further below. All embodiments comprise at least one signal distribution network layer, which involves the trivial possibility to use one- or two-dimensional corporate feed network topologies (i.e. representing a single contiguous tree, based on two-way power divider/combiner stages) at any HF signal port. A limitation of this approach is that only networks with $1+2^N$ ports are feasible, N being the number of binary divider hierarchy levels.

Many quasi-planar communication link (high directivity) antennas are using the binary corporate feed principle, but it is difficult to address every single radiator element of such 2-dimensional antenna arrays with an individual waveguide duct (one of the $2^N$ corporate feed network inputs/outputs) directly. In this case, a second signal distribution network layer can be used, e.g. for incorporating 2×2 radiator element subarrays (e.g. with cavity-backed slots) at every corporate feed network input/output. This yields $4 \times 2^N$ element arrays (e.g. 32×32=1024 elements with N=8). Suitable antenna embodiments for this approach are having at least 2 signal distribution network layers, e.g. the sixths embodiment, the seventh embodiment, the eighth embodiment, the ninth embodiment, the tenth and eleventh embodiment.

All embodiments with more than one signal distribution network layer (namely the sixth, seventh, eighth, ninth, tenth and eleventh embodiment are addressed here) are well suited for complex feed network topologies with multiple HF signal ports and multiple antenna subarray inputs/outputs. By way of a single (or pair) of waveguide ducts emanating from each HF signal port, and each first-level waveguide duct being vertically interconnected (to the second feed network layer) with up to 2 emanating branches, or each first-level waveguide duct arranged for serially feeding (as a resonant standing-wave feed or as a traveling wave feed) several single waveguide ducts or pairs of waveguide ducts incorporated in the second feed network layer, many options for radiator element numbers of subarrays exist (beyond powers of 2). Also, unequally-spaced sub-arrays, with a choice of sub-array sizes for transmit and receive functions, as well as long range, medium and short range radar sensor operation (varying sub-array antenna gain and beam width) are possible and especially useful for MIMO and virtual array digital beam forming applications of modern radar sensors.

Embodiments with a detached signal distribution network, i.e. which are not using part(s) of a system PCB (surface) for achieving their HF function, might comprise at least one double-ridged waveguide duct integrated into the injection molded layer, which serves as the second contact partner (the first being a metal layer on top of the system PCB).

Embodiments, which employ an electrically conducting surface layer of a system PCB (non-detached signal distribution network), might comprise at least one single-ridged waveguide duct as a first signal distribution network segment, which is integrated into the injection molded layer and is being closed to form a fully shielded structure by connecting it to the PCB metal surface.

Further embodiments employing an electrically conducting surface layer might comprise 2 single-ridged waveguide ducts, emanating from each PCB-side HF port and running into opposite directions, e.g. for supplying two mirror-symmetrically arranged antenna sub-arrays.

The deformable microstructures are designed so that the layers (contact partners) can be pressed against each other by applying a uniaxial force parallel to the z-axis (the coordinate axis which has an orthogonal orientation with respect to the two metal contact surfaces which are to be joined) so that the layers (contact partners) are brought into their mutual exact positions required for the intended function of the final product. While the deformable microstructures establish a low resistance or low impedance electrical contact, the typically low viscosity fluid, representing the yet uncured bonding agent, fills the gap resulting from the residual deformed microstructure height. By initiating the bonding agent hardening/curing and by optional secondary post-curing processes the contact partners are permanently connected. That is, the respective connection cannot be released (and re-connected) without destruction.

The deformable microstructures are designed so that they establish an anisotropic conductivity between the metal (lized) surfaces of the two contact partners. Such an anisotropic conductivity is very well suitable for realizing HF short-circuits.

Preferably, deformable microstructures having a conical shape or a truncated cone shape are employed in connection with all embodiments, since these shapes facilitate an exactly determined deformation behavior if a uniaxial pressure is applied during the assembling process. In this context it has to be kept in mind that the deformable microstructures are metal-coated or metalized. That is, there is a thin metal layer covering the cone-shaped or truncated cone-shaped deformable microstructures. This thin metal layer is contiguous and of more or less uniform thickness on the injection molded part's surface. Thus, one first contact of conventional methods (the first interface between a conductive particle and the first contact partner) is omitted. The remaining second contact is essential for reliably establishing an electric contact with the metal contact surface of the respective other contact partner. During the deformation of the cone-shaped or truncated cone-shaped deformable microstructures it is to be ensured that the thin metal layer is not ripped or torn open.

At least some of the embodiments comprise one or more of the following synthetic injection moldable materials: Polyphenylene Sulfide (PPS), Polyetherimide (PEI), Polysulfone (PSU), Polyethersulfone (PESU), Liquid crystal polymers (LCP), Polyamide (PA), Polyarylamide (PARA) and Acrylonitrile Butadiene Styrene (ABS). Most of these materials comprise filler materials or additives, such as mineral particles and fibres, having a certain minimum size (e.g. fibre length). When the molten material compound is injected into the mould, it cools down and solidifies most quickly next to the (cooler) mould surface, while embedding fibres in directions predominantly oriented parallel to the material flow. There is a "skin" of material with lower fibre and also other filler particle content than at average throughout the fabricated piece-part. This is the reason why plastic parts can show a shiny, as polished surface when coming out of polished moulds, although fabricated with high filler content compounds. With small features on top of the part surface (i.e. small mould cavities), this effect is even more pronounced and results in a partially filler-depleted local material composition.

Synthetic injection moldable materials are preferred where the minimum size (e.g. fibre length) is chosen so that no or almost no fillers or additives are present within the relatively small volumes of the small deformable microstructures. This means that the fillers or additives have no or almost no impact on the deformability of these microstructures, whereas inside the bulk of the 3-dimensional injection molded layer they will show their full function or effect (e.g. the reinforcement as well as shrinkage and warp reduction of the main injection moldable material).

All of the embodiments which comprise a plurality of deformable microstructures are characterized in that these deformable microstructures are an integral part of the 3-dimensional injection molded layer. That is, the deformable microstructures are produced in the same production step as the 3-dimensional injection molded layer. The positions of the individual deformable microstructures thus are very precisely aligned with respect to the other elements and features of the respective 3-dimensional injection molded layer. This is important to ensure low impedance HF short-circuits between the 3-dimensional, injection molded layer and the adjacent contact partner (e.g. another injection molded layer or a metal layer).

It is an advantage of at least some embodiments that the 3-dimensional engaging structures (deformable microstructures, limit stop structures, and 3-dimensional engaging structures), if used together, provide for a strengthening of the bond-line or interface between the two different material layers against shear forces.

It is an advantage of at least some embodiments that the 3-dimensional injection molded layer can be designed so as to realize/support several functions simultaneously.

It is an advantage of at least some embodiments that the 3-dimensional engaging structures prevent bond adhesion failures, because the resulting corrugated bond line has multiple segments that are oriented approximately orthogonal to the macroscopic strain gradient lines, thereby changing shear forces into less critical compression forces, locally. In other words, the joined parts are mutually locked by interdigitating each other.

At least some embodiments can be used as HF (e.g. radar) hollow waveguide networks or structures.

At least some embodiments can be used as microwave (e.g. radar) circuits comprising one or more of the following elements: couplers, filters, antennas, and so forth.

A radar apparatus, as presented herein, comprises at least one hybrid (microwave or radar) apparatus with
 a first contact partner having a first metal contact surface,
 a 3-dimensional injection molded layer serving as second contact partner and having a second metal contact surface, and
which comprises a plurality of deformable microstructures serving as electric pressure contacts when assembling said first contact partner and said second contact partner, and wherein an electrically isolating bonding agent is situated between said first contact partner and said second contact partner, and wherein said radar apparatus further comprises at least one radar integrated circuit for generating a radar signal and/or for processing a received radar signal, and wherein
 said 3-dimensional injection molded layer or a further 3-dimensional injection molded layer provides signal interconnect functions for routing a radar signal between said radar integrated circuit and one or more waveguide ducts defined by at least two adjacent layers of apparatus, and
 said 3-dimensional injection molded layer or a further 3-dimensional injection molded, electroformed or die-cast layer, or a further metal layer provides for radiation and reception functions.

This summary is not exhaustive of the scope of the present aspects and embodiments. Thus, while certain aspects and embodiments have been presented and/or outlined in this summary, it should be understood that the present aspects and embodiments are not limited to the aspects and embodiments in this summary. Indeed, other aspects and embodiments, which may be similar to and/or different from, the aspects and embodiments presented in this summary, will be apparent from the description, illustrations and/or claims, which follow.

It should also be understood that any aspects and embodiments that are described in this summary and do not appear in the claims that follow are preserved for later presentation in this application or in one or more continuation patent applications.

BRIEF DESCRIPTION OF THE DRAWINGS

Other advantages and features will become apparent from the following detailed description, which are to be understood not to be limiting, are described in more detail below with reference to the drawings.

DETAILED DESCRIPTION

Figure 1A:
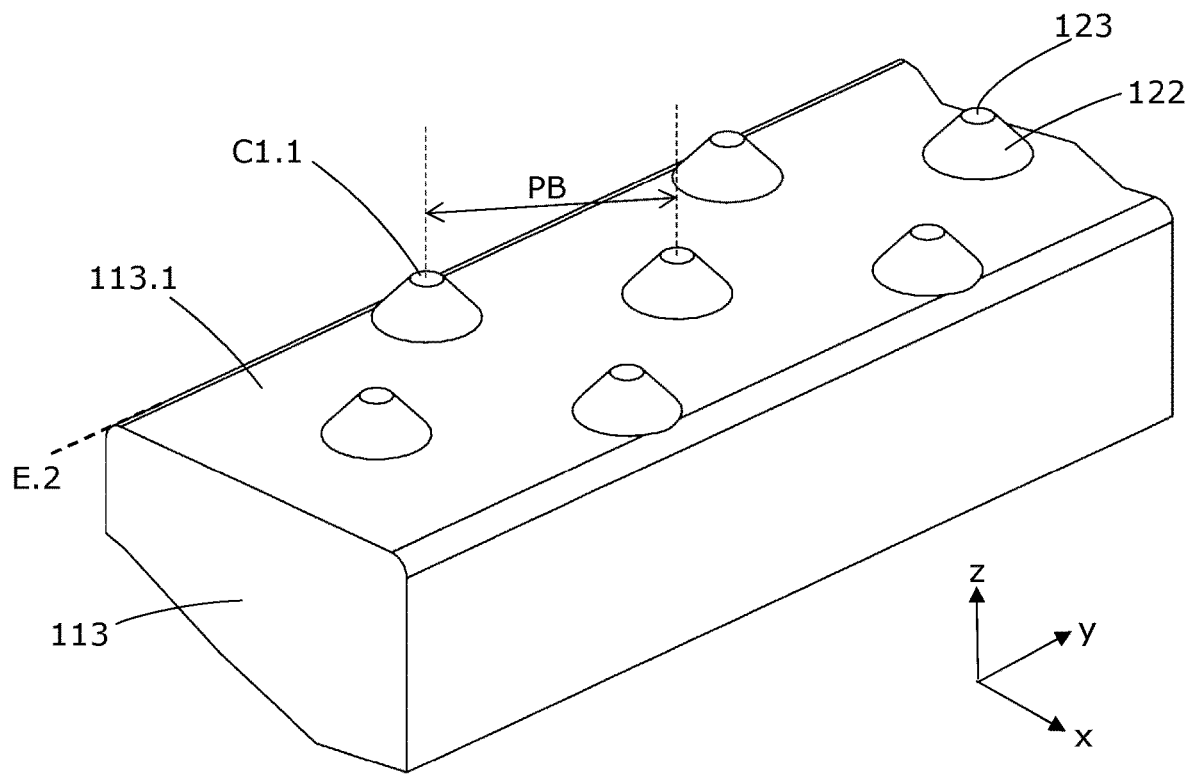
FIG. 1A schematically shows a perspective top view of an embodiment of a 3-dimensional injection molded layer of an apparatus which comprises a plurality of deformable microstructures.

In connection with the present description, terms are used which also find use in relevant publications and patents. It is noted however, that the use of these terms shall merely serve a better comprehension. The inventive idea and the scope of the patent claims shall not be limited in their interpretation by the specific selection of the terms. The invention can be transferred without further ado to other systems of terminology and/or technical areas. In other technical areas, the terms are to be employed analogously.

For the purposes of the present description and claims, some of the essential elements, building blocks or layers of an apparatus 100 are defined before details of various embodiments are being addressed.

All embodiments of the apparatus 100 comprise a layer structure with at least the following two combinations of layers.

Either
- a metal layer 112 (e.g. a sheet metal, metal foil, a bulk metal or a carrier (e.g. a PCB) comprising a metallization), and
- an injection-molded layer 113, or
- a first injection-molded layer 113, and
- a second injection-molded layer 115.

It is important to provide functional interfaces between the surface layers of these layer structures. There are a number of interfacing structures presented herein which serve as functional interfaces. These interfacing structures can be combined, as needed.

The respective interfacing structures are characterized by their form and/or material properties and/or function. The following group of interfacing structures are addressed herein:
- deformable microstructures C1.$i$ serving as pressure contacts when assembling two layers (e.g. a metal layer 112 and an injection molded layer 113 having a metallized surface facing the metal layer 112) and providing an electric contact between the respective layers. The deformable microstructures C1.$i$ are herein also referred to as deformable microcontacts C1.$i$ or as deformable electrical microcontacts C1.$i$.
- 3-dimensional engaging structures C3.$i$ comprising a first portion (e.g. an expansion bolt 119, cf. FIG. 7; a post 117, cf. FIG. 4A-6D) being situated on or in one layer (e.g. on or in an injection molded layer 113) and a second portion (e.g. a hole 118 cf. FIG. 4B, FIG. 5A) being situated on or in another layer (e.g. on or in a metal layer 112), wherein the first portion engages with said second portion when assembling the two layers.
- Limit stop structures C2.$i$ defining a relative stop position when assembling two layers (e.g. an injection molded layer 113 and a metal layer 112), where a uniaxial pressure is applied during the assembly process.

The term "deformable microstructure" C1.$i$ is herein used for small structures (as compared to the limit stop structure C2.$i$) which are designed and/or which comprise a material which makes the respective microstructure at least partially deformable if a uniaxial pressure is applied during the assembly process.

In at least some embodiments, the deformable microstructures C1.*i* protrude from the respective surface 113.1 or project into the half space above this surface 113.1. It is an advantage of the protruding or projecting deformable microstructures C1.*i* that no counterpart structure, pad, or other conductive mating element is required on any of the opposing surfaces (e.g. on the surface 112.1).

In at least some embodiments, the deformable microstructures C1.*i* are designed so that they are able to even bridge small gaps between two layers (e.g. the layers 112 and 113) which might occur due to local tensions, surface imperfections (e.g. caused by fabrication tolerances) or structures which are integrated into one of two layers. In other words, preferably, the deformable microstructures C1.*i* are designed so that they assure a robust electrical contact between slightly uneven contact partners (such as the layers 112 and 113). This can be achieved by providing sufficient "overtravel" between the first position of contact and the final assembly position.

The deformable microstructures C1.*i* are used to provide an electrical contact. These microstructures C1.*i* are thus referred to as deformable microcontacts C1.*i* or as deformable electrical microcontacts C1.*i*. The deformable microstructures C1.*i* are designed in order to each establish a punctiform HF-shortcircuit between the contact partners CP1 and CP2, for example.

For a 77 GHz radar application, for example, it is advantageous to provide 250 to 1000 punctiform HF-shortcircuits per square centimeter.

In order to be able to reliably realize such HF-shortcircuits, the deformable microstructures C1.*i* are designed to guarantee local ohmic transitions with a very low impedance. The electrically isolating bonding agent 114 as such is non-conductive. That is, the bonding agent 114 does not comprise any conductive particles, flakes, spheres and the like. This means that the deformable microstructures C1.*i* and not the bonding agent 114 are used to define and realize the HF-shortcircuits, which connect the constituents of realized waveguide ducts or cavity-like resonators.

In the HF-regime, the impedance of the HF-shortcircuits and the position of these HF-shortcircuits with respect to the other elements/features (e.g. waveguide ducts or cavities) of the contact partners CP1, CP2, CP3 is essential. In at least some embodiments, thus the mutual distance PB between adjacent deformable microstructures C1.*i* is smaller than $\lambda m/4$, where $\lambda m$ is the wavelength in the material (cf. FIG. 1A).

Close to waveguide ducts or cavities, the mutual distance PB might even be shorter. In other words, where needed from an HF point of view, the density of deformable microstructures C1.*i* might be locally increased.

In at least some embodiments, the deformable microstructures C1.*i* are designed so that they have a (limited) local plastic deformability.

In at least some embodiments, each of the deformable microstructures C1.*i* comprises a 3-dimensional structure with a resilient core and a deformable conductive coating or outer layer.

Figure 1B:
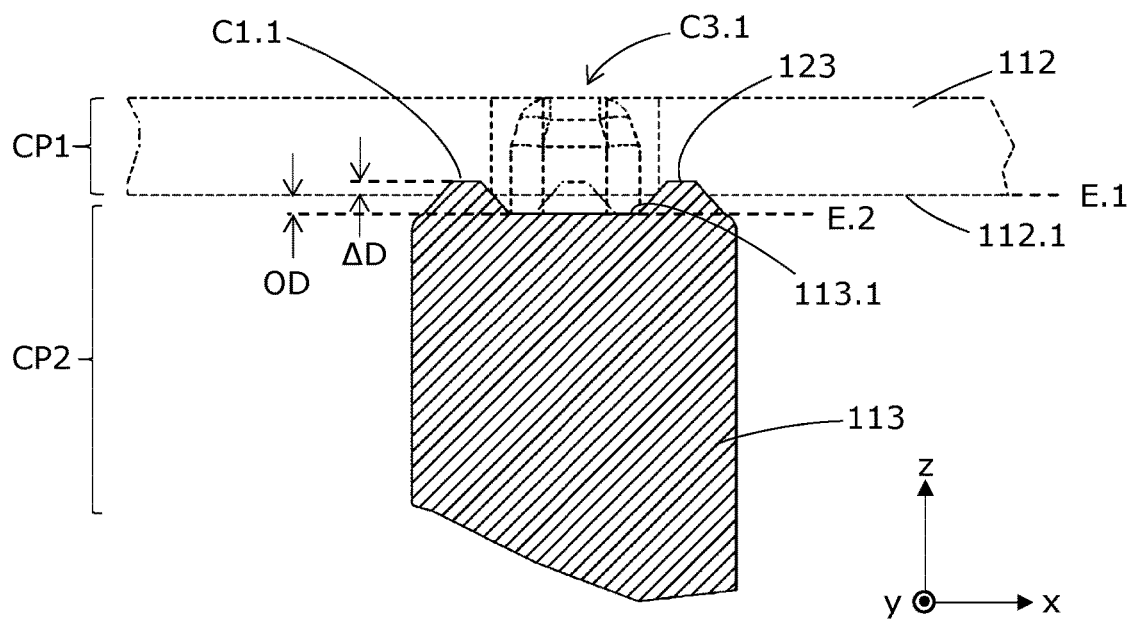
FIG. 1B schematically shows a cross-section of the injection molded layer of FIG. 1A together with a metal layer (dashed) in its final target position after it was pressed against the deformable microstructures.
Figure 1C:
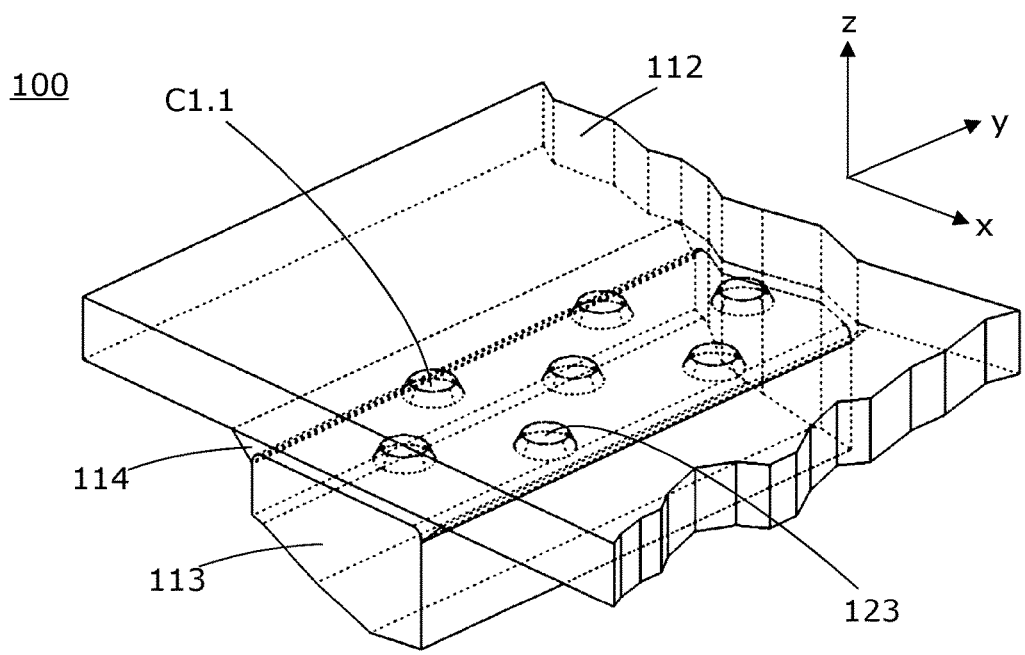
FIG. 1C schematically shows a perspective, semi-transparent top view of the injection molded layer and metal layer of FIG. 1B in the assembled state.

In at least some embodiments, the apparatus 100 comprises a plurality of deformable microstructures C1.*i*, wherein
- a metallization of a surface of the 3-dimensional injection molded layer 113 serves as metal contact surface 113.1, and
- wherein the plurality of deformable microstructures C1.*i* is situated on this metal contact surface 113.1, as illustrated in FIGS. 1A-1C, for example.

Preferably, the deformable microstructures C1.*i* of at least some embodiments are pressure loaded during fabrication process up to the point where the initial elastic (recoverable) deformation changes over into plastic (irreversible) deformation when the contact partner, which carries the deformable microstructures C1.*i*, is uniaxially pressed (during the assembly process) against the other contact partner which has a harder (metal) surface.

In at least some embodiments, one or more of the following elements or features are used as deformable microstructures C1.*i*:
- pimples C1.1 (cf. FIG. 1A),
- knobs,
- bumps,
- nodules, or other small protrusions.

The term "pimple" is herein used for a truncated cone which comprises an inclined enveloping surface 122 and an approximately flat uppermost surface 123 (cf. FIG. 1A).

For practical reasons, e.g. limitation of mold building processes, pimples can also have a rounded-off transition between surface 123 and the enveloping surface 122, or even have a convex, e.g. spherical uppermost surface 123.

FIGS. 1A-1C show an embodiment where truncated cone-shaped pimples C1.1 serve as deformable microstructures C1.*i*. FIG. 1A shows a small portion of the metal contact surface 113.1 of the injection molded layer 113. The deformable microstructures C1.*i*, which are an integral part of the layer 113, in this example have a homogeneous planar distribution so as to ensure an even force distribution when during the assembly process a uniaxial pressure is applied.

FIG. 1B shows the (plastic) deformation range AD of the deformable microstructures C1.*i*. During the assembly process, the layer 112 is positioned above the layer 113. Then a well-defined uniaxial pressure is applied in order to ensure a robust contact between the contact partners CP1 and CP2. During this phase of the assembly process, the deformable microstructures C1.*i* develop a progressive (plastic) deformation. The total force FT applied by uniaxial pressing divides into FT/n, effecting every initial contact point (assumed, there are n pimples). Due to the conical shape, local pressure is highest right below the surfaces 123 and plastic deformation starts here. The material can only flow radially to the side, while squeezing bonding agent out of the former surrounding gap. With progressing deformation, mechanical resistance of the joint is increasing due to the increasing local and overall contact area, while electrical overall contact resistance drops. The metal layer on top of the contact partner CP2 is conforming to the CP1 surface microstructure due to the pressure from both above and below its plane. FIG. 1B shows the final (stable) position of the contact partner CP1 relative to the contact partner CP2 with a residual gap OD (in FIG. 1B the bonding agent 114 was omitted).

FIG. 1C shows the situation after the (plastic) deformation has taken place. As one can see in FIG. 1C, when compared with FIG. 1A, for example, the diameter of the uppermost surfaces of the individual microstructures C1.*i* now is larger than the diameter of the uppermost surfaces 123 of the not-deformed microstructures C1.*i*. The angle of the enveloping wall with respect to the surface 113.1 has also increased. This is, because the base diameter of the pimples stays nearly unchanged, since plastic deformation does not arrive quite here.

All embodiments comprise a bonding agent 114 which is used to fix the relative position of the two contact partners CP1 and CP2.

Preferably, all embodiments comprise a homogeneous planar distribution of the deformable microstructures C1.i so as to ensure an even force distribution.

In order to be able to define the orientation of the elements/components of the apparatus 100, an x-y-z coordinate system is used and the various levels or planes are referred to as planes E.1, E.2 etc. The planes E.1, E.2 etc. are oriented parallel to the x-y-plane. E.1 defines the level of the metal contact surface 112.1 of the layer 112 and E.2 defines the level of the metal contact surface 113.1 of the layer 113, for example.

In at least some embodiments, the deformable microstructures C1.i have one of the following shapes:
- cone (before deformation) and truncated cone (after deformation);
- truncated cone (before deformation) and truncated cone with reduced height (after deformation) (cf. FIG. 1A-1C, for example);
- pyramid (before deformation) and frustum of a pyramid (after deformation);
- frustum of a pyramid (before deformation) and frustum of a pyramid with reduced height (after deformation);
- tetrahedron (before deformation) and frustum of a tetrahedron (after deformation);
- frustum of a tetraeder (before deformation) and frustum of a tetrahedron with reduced height (after deformation);
- modifications of a cone, pyramid or tetrahedron.

In at least some embodiments, a bonding agent 114 is used between the two contact partners (e.g. between the layers 112, 113). A bonding agent 114 is a substance which can harden or which increases its viscosity by orders of magnitude. The bonding agent 114 might comprise a substance which forms cross-links while hardening or while increasing its viscosity.

In at least some embodiments, the bonding agent 114 is used in order to fix the two contact partners with respect to each other and/or to permanently maintain the deformable microstructures C1.i, after the application of a uniaxial pressure, in the contact-establishing compression stage.

In at least some embodiments, the bonding agent 114 is used in order to seal the two contact partners or the interface region from environmental influences (e.g. humidity).

The word "engaging", which is used in connection with the 3-dimensional engaging structures (C3.1, C3.2 . . . ), not only applies to solutions where one part locks with a counterpart or where one part catches a portion of a counterpart, for example. The term "3-dimensional engaging structures" also is meant to include interlaced and intertwined solutions as well as solutions where one part engages with a (complementarily designed) counterpart (like a male plug with its female counterpart).

At least some embodiments comprise 3-dimensional engaging structures (C3.1, C3.2 . . . ) which interleave in a 3D fashion and/or which form a "lacing bond" between at least two contact partners (e.g. between the layers 112 and 113).

It is the main purpose of the 3-dimensional engaging structures (C3.1, C3.2 . . . ) to strengthen the bond-line or interface against shear forces. Such shear forces might for instance be caused by contact partners having different coefficients of thermal expansion.

Figure 5A:
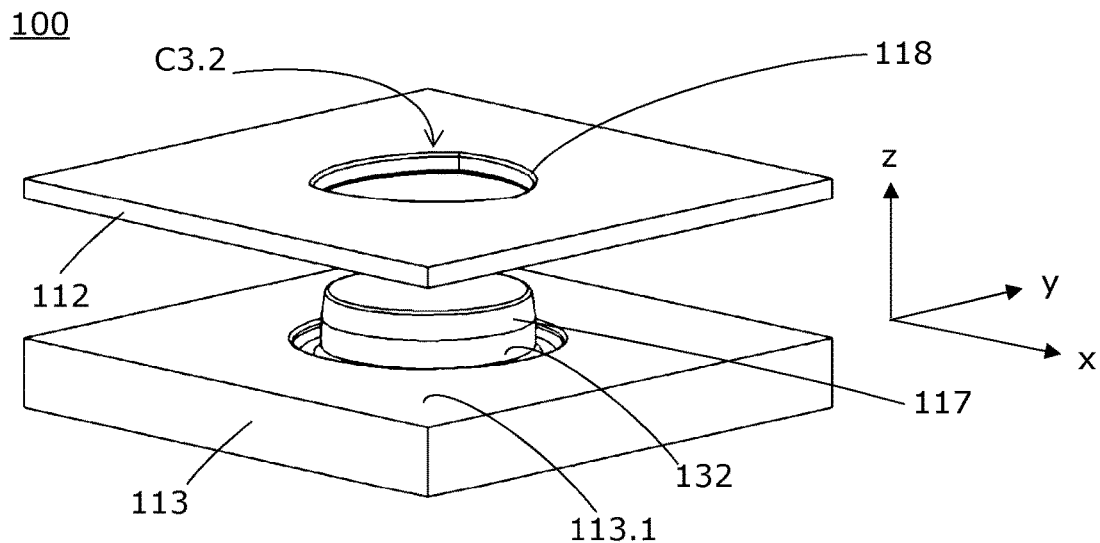
FIG. 5A schematically shows a perspective exploded view of an embodiment of a 3-dimensional injection molded layer and a metal layer of an apparatus which comprises another 3-dimensional engaging structure.
Figure 5B:
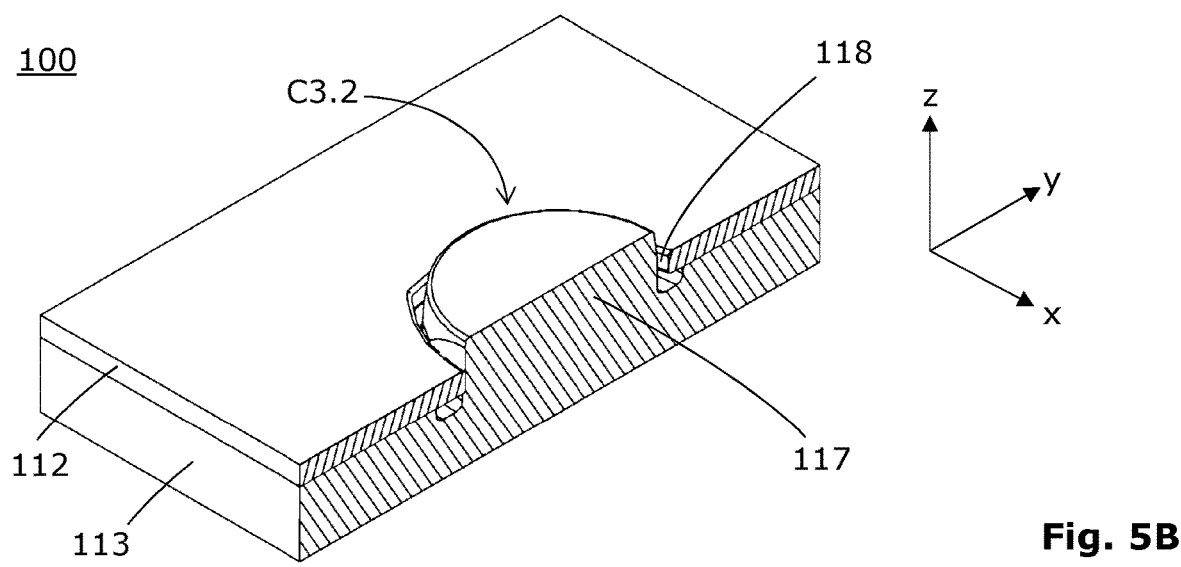
FIG. 5B schematically shows a cross-section of the apparatus of FIG. 5A in the assembled state.

At least some embodiments comprise 3-dimensional engaging structures (e.g. C3.2, FIG. 5A, 5B; C3.3, FIG. 6A-6C) providing for a centering or alignment of the two contact partners when being assembled.

Preferably, those embodiments which comprise a metal layer 112 and an injection molded layer 113 as contact partners, employ a plurality of 3-dimensional engaging structures, since the alignment of these contact partners might be critical.

At least some embodiments comprise 3-dimensional engaging structures being used to provide a well-defined reference or registration of the respective contact partners. This might be essential for an apparatus 100 serving as travelling wave antennas, where alternating slot positions left and right of a center line determine the amplitude of the individual slot excitation dependent of its absolute distance from the waveguide center line.

In order to achieve a robust, yet compliant fit between features of two contact partners, the combination of a circular (slightly conical) post 117 (cf. FIGS. 5A and 5B, 6A-6D) and a circular-arc based trifold rotation symmetric hole 118 (cf. FIG. 5A, 5B, 5C, 6A-6D) is proposed. Such a circular-arc based trifold rotation symmetric hole 118 is well suited for use in connection with a metal layer 112. If a first injection molded layer 113 is to be assembled with a second injection molded layer 115, then a recess in one of the injection molded layers might be used to catch the post 117 of the other injection molded layer.

At least some of the embodiments comprise an electro-formed metal layer or a die-cast metal layer instead of the injection molded layer 115.

Figure 7:
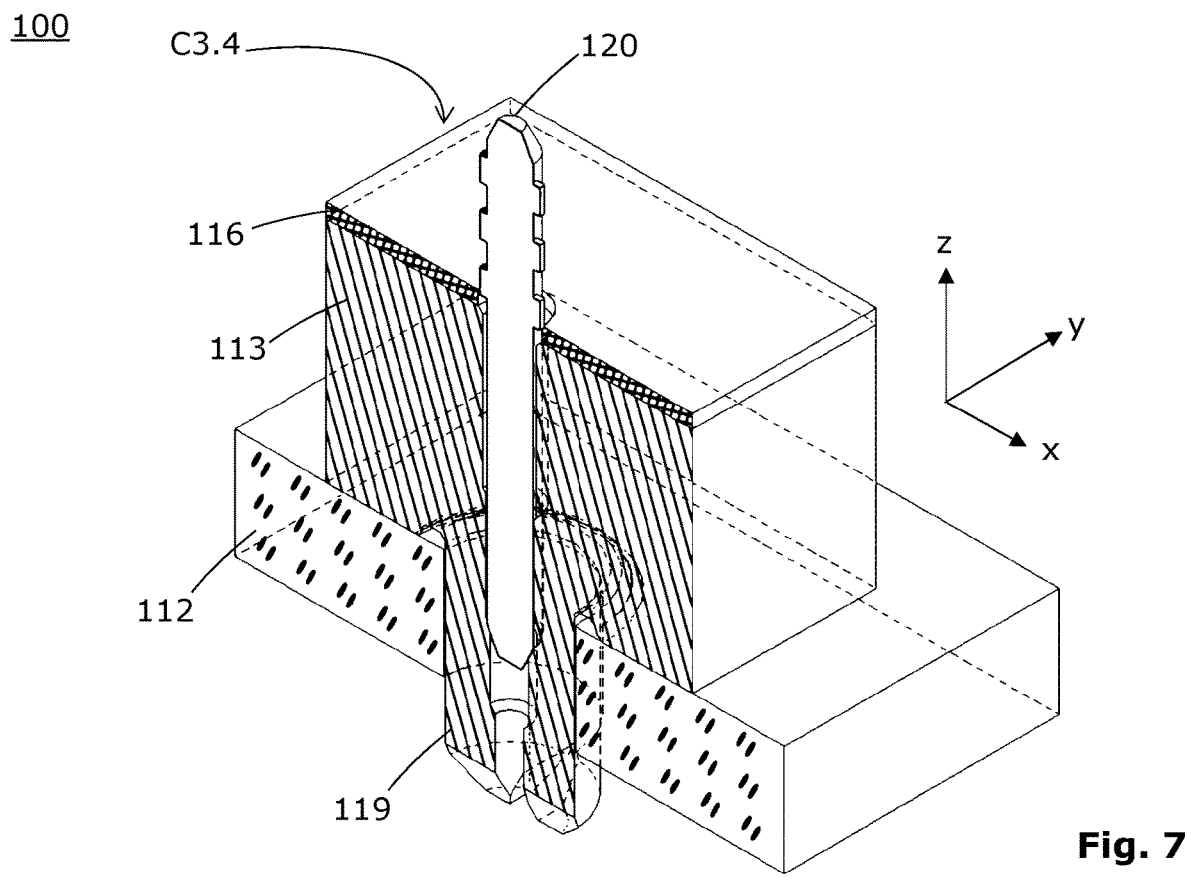
FIG. 7 schematically shows a perspective view of another apparatus comprising a 3-dimensional injection molded layer, a metal layer, and one 3-dimensional engaging structure.

FIG. 7 shows an embodiment where a 3-dimensional engaging structure C3.4 is employed which provides for a centering/alignment and for a locking of the respective other contact partner until the bonding agent 114 has at least partially cured.

The embodiment of FIG. 7 comprises an expansion bolt 119. This expansion bolt 119 is preferably integrated with the layer 113. The contact partner 113 also comprises a central through hole which is designed to receive a (metal) pin 120. This pin 120, when being inserted (e.g. from the antenna front face side) into the through hole, expands the bolt 119. With a proper design of the expansion bolt 119 and pin 120, this 3-dimensional engaging structure C3.4, i.e. the bolt 119, expands to a tight (pressure) fit inside the alignment hole present in contact partner 112 and it further expands the bolt 119 beyond the hole diameter on the rear (lower in FIG. 7) side of the layer 112. As illustrated in FIG. 7, there might be a metal sheet or metal lid 116 situated on top of the injection molded layer 113.

Figure 3A:
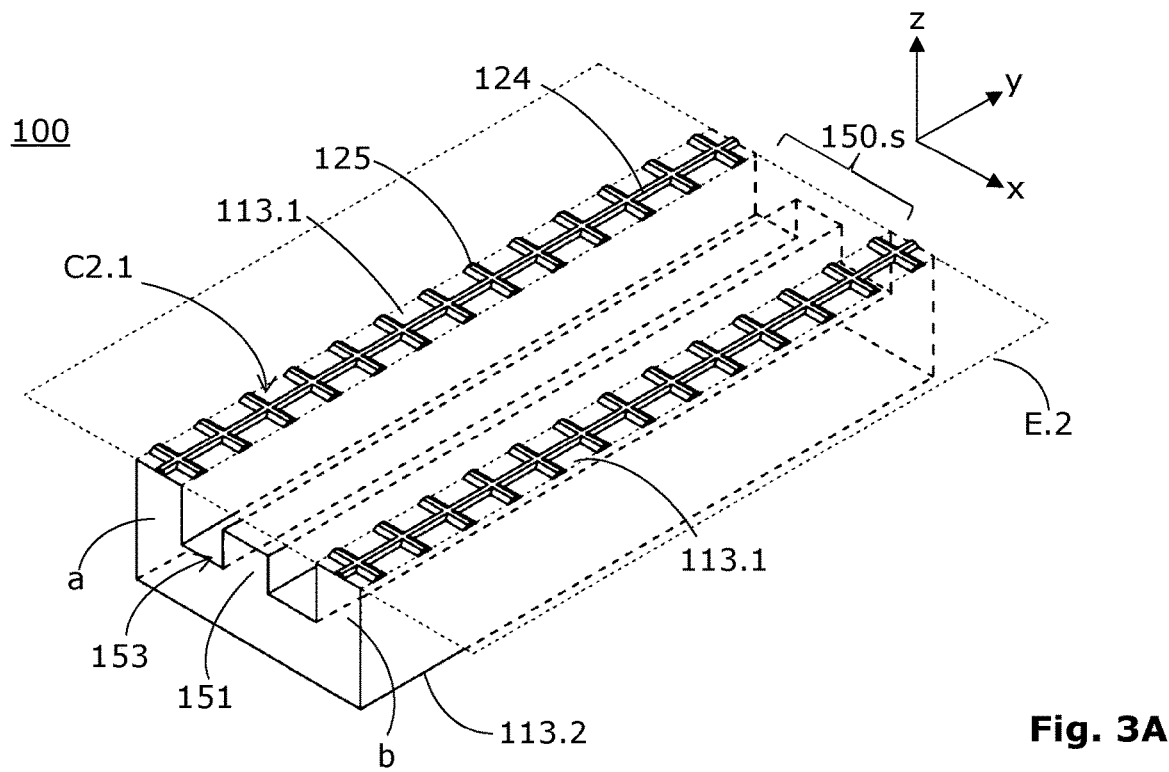
FIG. 3A schematically shows a perspective top view of an embodiment of a 3-dimensional injection molded layer with exemplary limit stop structures.
Figure 3B:
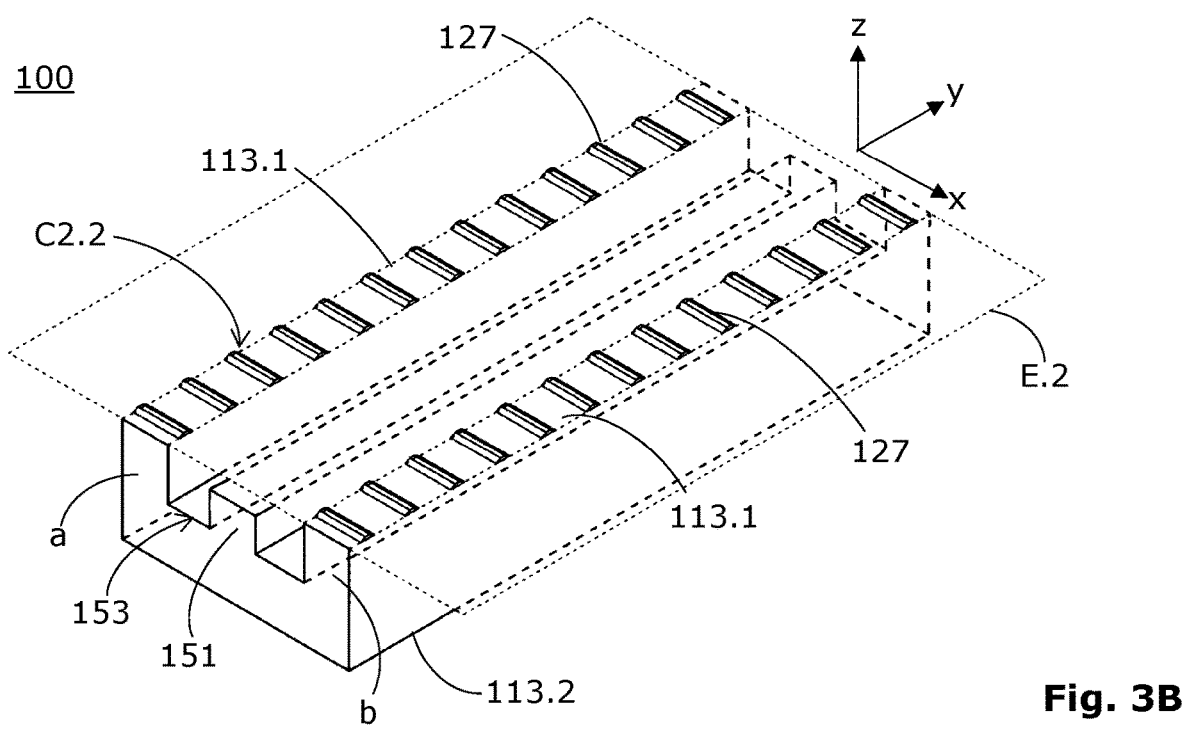
FIG. 3B schematically shows a perspective top view of an embodiment of a 3-dimensional injection molded layer with another exemplary limit stop structures.
Figure 3C:
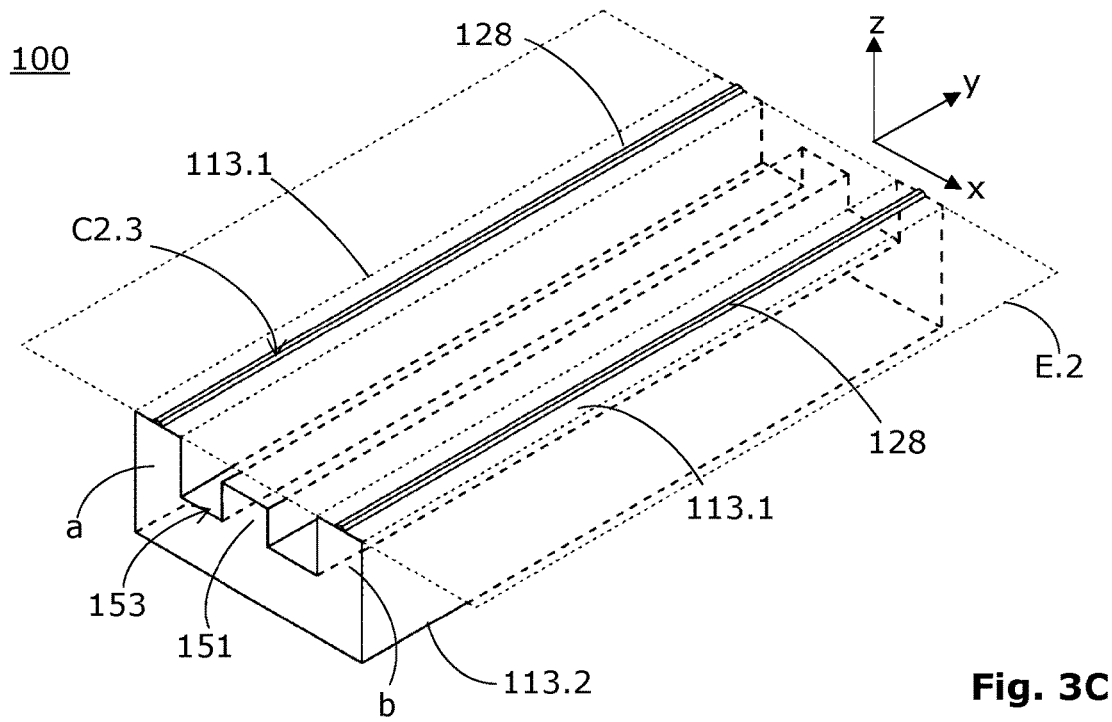
FIG. 3C schematically shows a perspective top view of an embodiment of a 3-dimensional injection molded layer with another exemplary limit stop structures.
Figure 3D:
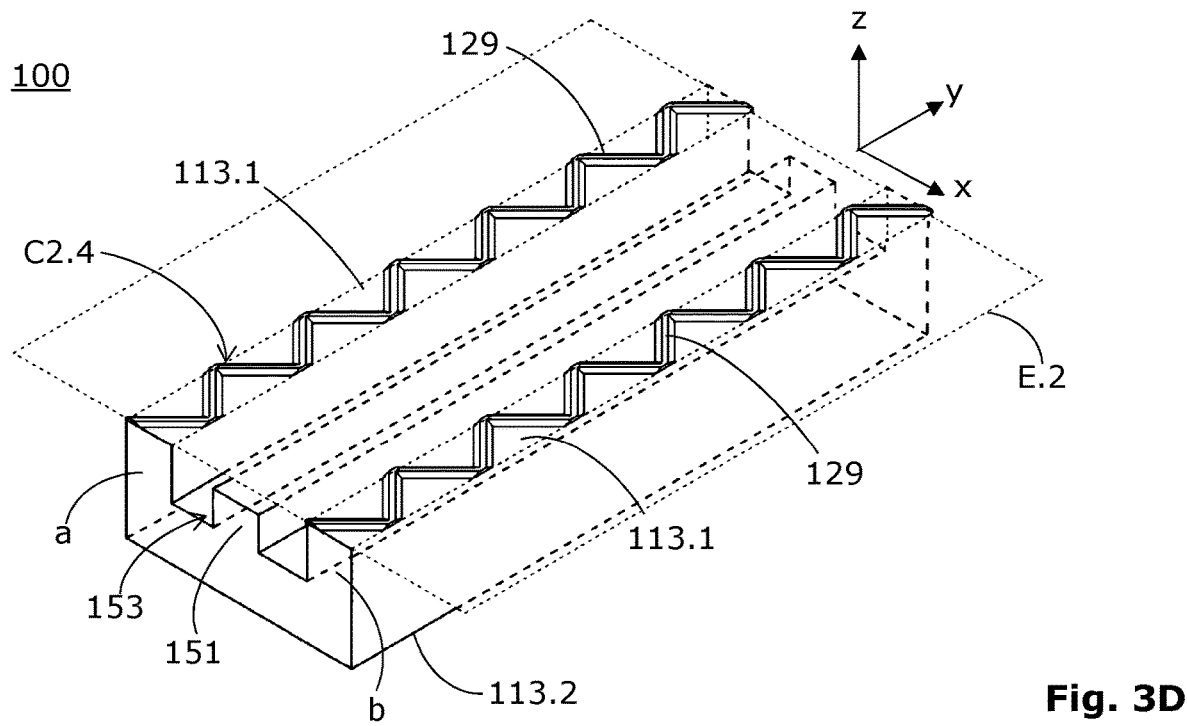
FIG. 3D schematically shows a perspective top view of further exemplary limit stop structures serving as interfacing structures.
Figure 3E:
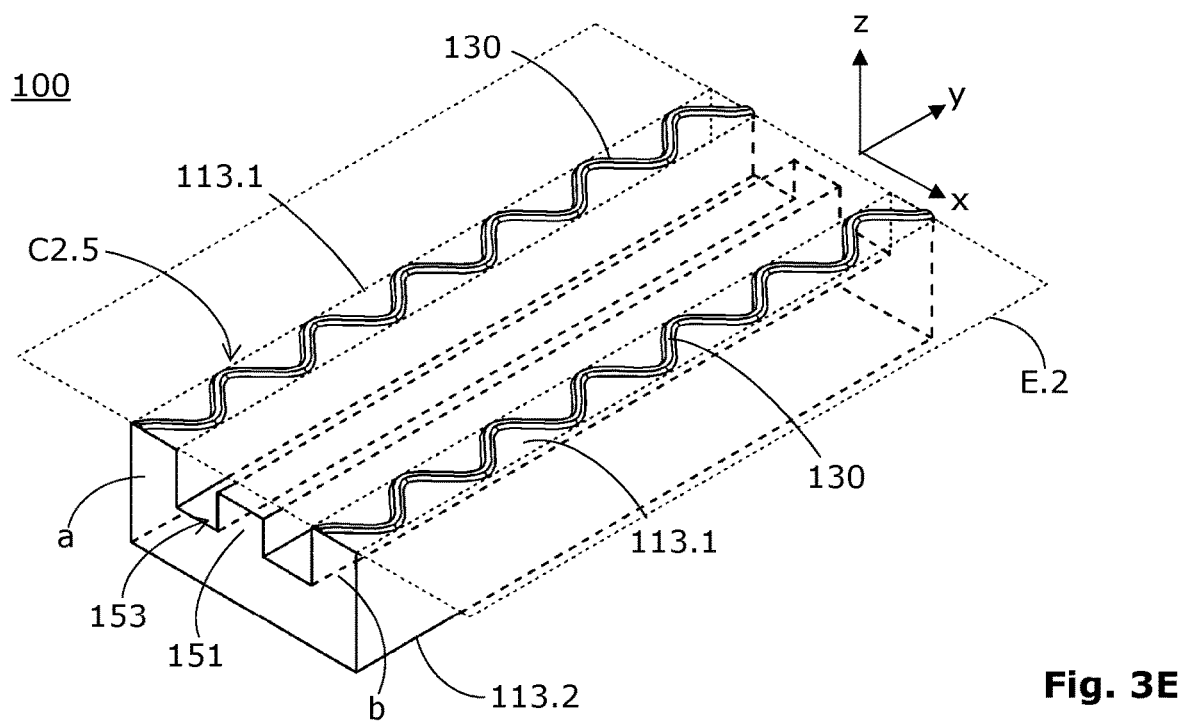
FIG. 3E schematically shows a perspective top view of further exemplary limit stop structures serving as interfacing structures.
Figure 8:
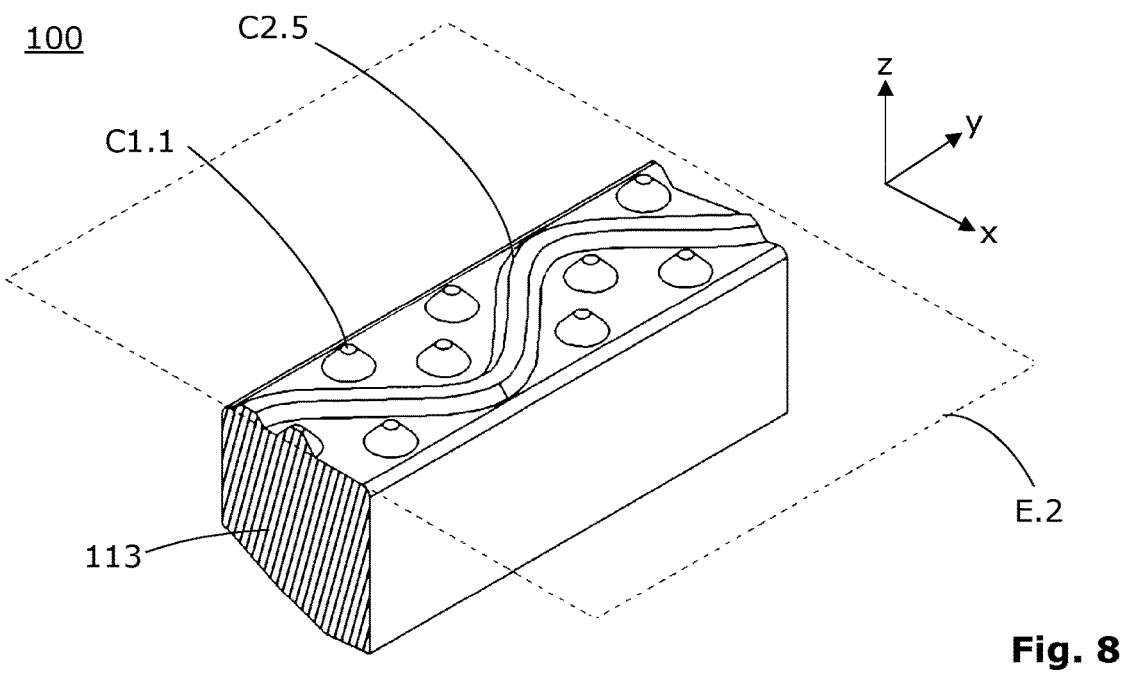
FIG. 8 schematically shows a perspective top view of another apparatus comprising a 3-dimensional injection molded layer with deformable microstructures and a limit stop structure.

FIG. 8 shows a portion of another apparatus 100 comprising a 3-dimensional injection molded layer 113 with deformable microstructures C1.1 (like the ones shown in FIG. 1A-1C) and a limit stop structure C2.5 (like the one shown in FIG. 3E). The embodiment of FIG. 8, where deformable microstructures C1.i are combined with limit stop structure C2.i, is very advantageous, since the orthogonal distance OD (cf. FIG. 1B) between the layer 113 and for example a layer 112 can be reproduced in a production process very exactly.

At least some embodiments comprise limit stop structures C2 defining a relative stop position when assembling two contact partners (e.g. the injection molded layer 113 and the metal layer 112).

If these limit stop structures C2 are used together with a plurality of deformable microstructures C1.i, then the limit stop structures C2 do not have to provide for an electric contact between two contact partners. But to improve the electric contact, the limit stop structures C2 and the deformable microstructures C1.i both might provide for an electric contact between two contact partners. If the limit stop structures C2 are designed to also provide an electric contact, then these structures C2 are also referred to as limit stop contacts.

In at least some embodiments, limit stop structures C2 have larger dimensions (in the x-y-plane) than the deformable microstructures C1.$i$. Preferably, the limit stop structures C2 have a total contact surface area between 5 and 20 times larger than the accumulated deformable microstructures C1.$i$ contact area in compressed state.

In at least some embodiments, the limit stop structures C2.$i$ have one of the following shapes:
- orthogonal ridge structures (cf. FIG. 2A, 2B, 3A) with a central ridge 124 and several fins or branches 125;
- a ladder shape with one ridge per wall a, b, and with a plurality of (cross-) beams;
- columns of short parallel or mutually inclined ridges 127, 131 (cf. FIG. 3B, FIG. 3F);
- several parallel ridges 128 (cf. FIG. 3C);
- at least two offset wavy lines 129 (cf. FIG. 3D);
- at least two wavy lines 130 in a "synchronized" arrangement (cf. FIG. 3E);

The above-mentioned examples of limit stop structures C2 can be combined with each other.

In at least some embodiments, the limit stop structures C2 have a height (parallel to the z-axis) which is a little shorter than the initial gap between the two contact partners. That is, there is a thin air gap between the limit stop structures C2 and the opposing layer of the respective other contact partner. This air gap is either filled with the bonding agent 114 prior to applying a uniaxial pressure or the bonding agent 114 is caused to "flow" into this air gap, e.g. by capillary forces, while the uniaxial pressure is applied. The provision of an air gap filled with the bonding agent 114 allows for a positive substance contact and mechanical force transfer in finished product operation, despite certain piece-part manufacturing tolerances.

Figure 3F:
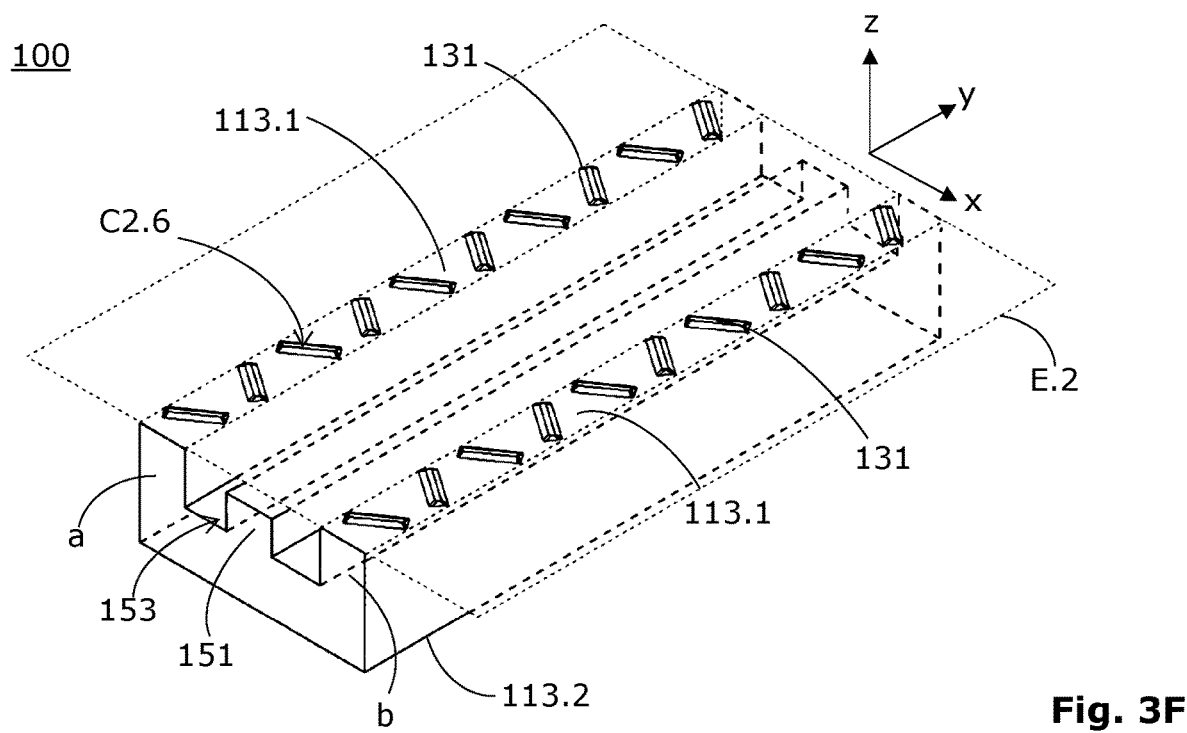
FIG. 3F schematically shows a perspective top view of further exemplary limit stop structures serving as interfacing structures.

In at least some embodiments, the limit stop structures C2 are designed/arranged so that fully enclosed (trapped) volumes of bonding agent 114, and possible air bubbles, are avoided. For this reason limit stop structures C2 are preferred which are open to the sides. This applies for example to the limit stop structures C2.1 (FIG. 3A), C2.2 (FIG. 3B), C2.3 (FIG. 3C), C2.4 (FIG. 3D), C2.5 (FIG. 3E) and C2.6 (FIG. 3F). The air bubbles might have an impact on the HF-quality of the electric contact and air bubbles have the disadvantage to cause local mechanical stress peaks, deformations and inhomogeneity.

Figure 2A:
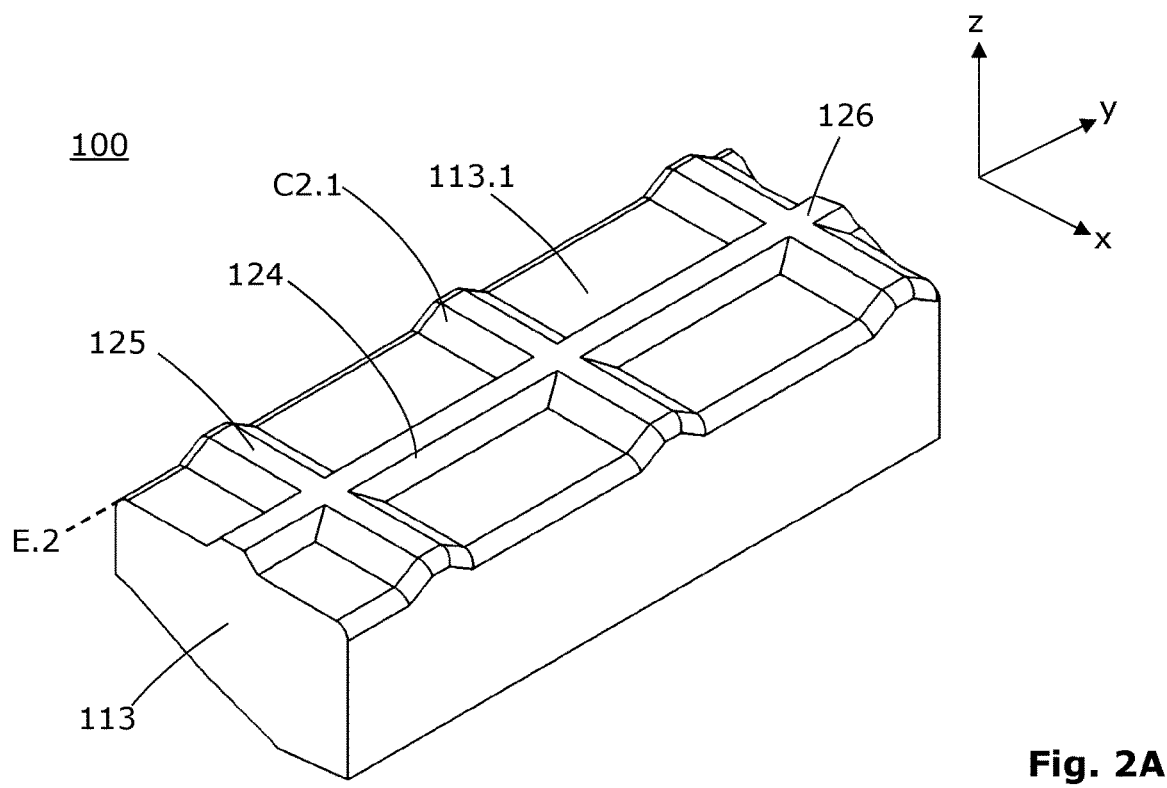
FIG. 2A schematically shows a perspective top view of an embodiment of a 3-dimensional injection molded layer of an apparatus which comprises a limit stop structure.
Figure 2B:
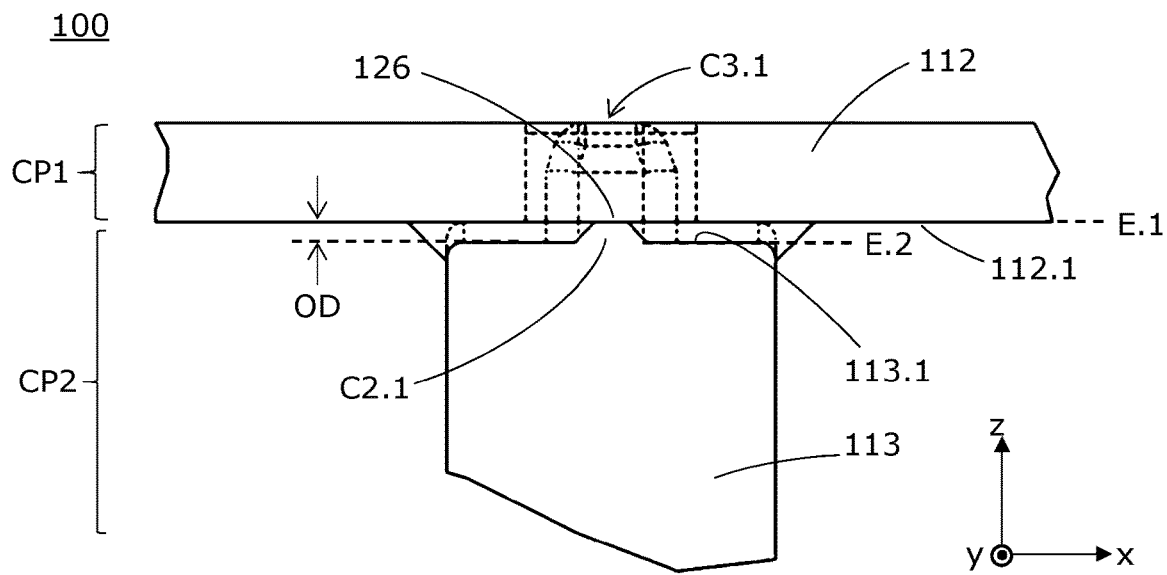
FIG. 2B schematically shows a side view of the injection molded layer of FIG. 2A together with a metal layer in its final position after it has reached the upper most surface of the limit stop structure.

FIGS. 2A-2B show an embodiment where a longitudinal central ridge 124 and a number of fins or branches 125 serve as limit stop structure C2.1. In this embodiment, the limit stop structure C2.1 is situated on the upper metal contact surface 113.1 of a side wall of the injection molded layer 113. FIG. 2B shows that in the assembled state the lower metal contact surface 112.1 of the layer 112 sits right on top surface 126 (cf. FIG. 2A) of the limit stop structure C2.1. When applying the uniaxial pressure, the limit stop structures C2.$i$ are not (or only reversibly, i.e. elastically) compressed.

All limit stop structures C2.$i$ presented herein are designed so that a planar bearing or support is provided when during the assembly process a uniaxial pressure is applied. Therefore, the compression rate of nearby deformable microstructures C1.$i$ is very well controlled.

The FIGS. 3A-3F show various embodiments of limit stop structure C2.1-C2.6. These limit stop structures C2.1-C2.6 can be used in connection with all embodiments presented herein.

FIG. 3A schematically shows a perspective top view of an embodiment of an apparatus 100 comprising a 3-dimensional injection molded layer 113. The 3-dimensional injection molded layer 113 of this apparatus 100 comprises a single-ridged waveguide 150.$s$ (cf. FIG. 3A for example) where a ridge 151 is sitting inside a duct or conduit 153. The layer 113 further comprises two side walls a, b (extending parallel to the ridge 151 and parallel to the y-axis). Each of these side walls a, b has a metal contact surface 113.1. Said metal contact surfaces 113.1 define a plane E.2. There are two limit stop structures C2.1 similar to the limit stop structures C2.1 of FIG. 2A, 2B.

The description of FIG. 3A also applies to the FIGS. 3B-3F. In the following, only the important differences are being addressed.

The apparatus 100 of FIG. 3B comprises two limit stop structures C2.2. Each of these limit stop structures C2.2 comprises a column with a plurality of short parallel ridges 127.

The apparatus 100 of FIG. 3C comprises two limit stop structures C2.3. Each of these limit stop structures C2.3 comprises a longitudinal ridge 128.

The apparatus 100 of FIG. 3D comprises two limit stop structures C2.4. Each of these limit stop structures C2.4 comprises a zig-zag line 129.

The apparatus 100 of FIG. 3E comprises two limit stop structures C2.5. Each of these limit stop structures C2.5 comprises a wavy line 130.

The apparatus 100 of FIG. 3F comprises two limit stop structures C2.6. Each of these limit stop structures C2.6 comprises a column with a plurality of short ridges 131 arranged in a zig-zag manner, when modifying the columns of FIG. 3B by inclining subsequent ridges in opposite sense (inclination ranges may range from 0° to 90°). In the latter, limiting case, a periodically interrupted longitudinal ridge is provided).

Figure 4A:
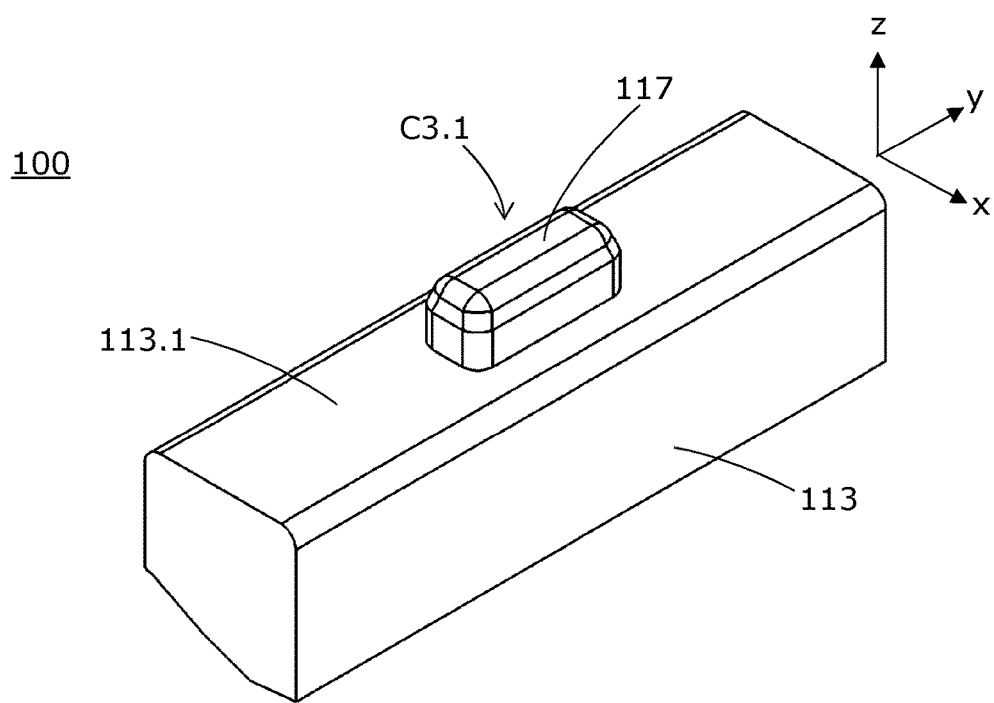
FIG. 4A schematically shows a perspective top view of a portion of an embodiment of a 3-dimensional injection molded layer of an apparatus which comprises one 3-dimensional engaging structure.
Figure 4B:
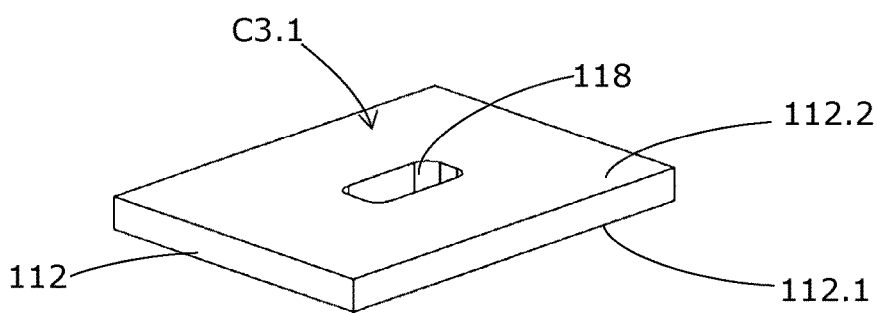
FIG. 4B schematically shows a perspective exploded view of further components/elements of the apparatus of FIG. 4A.
Figure 4B:
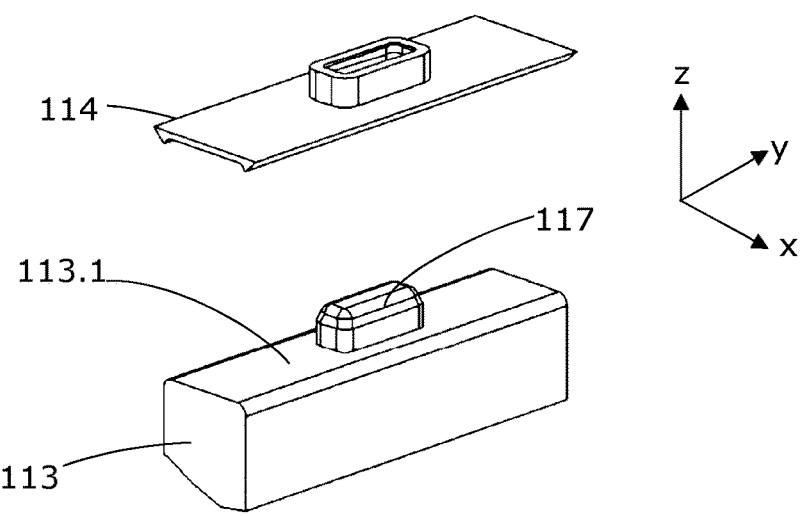
Figure 4C:
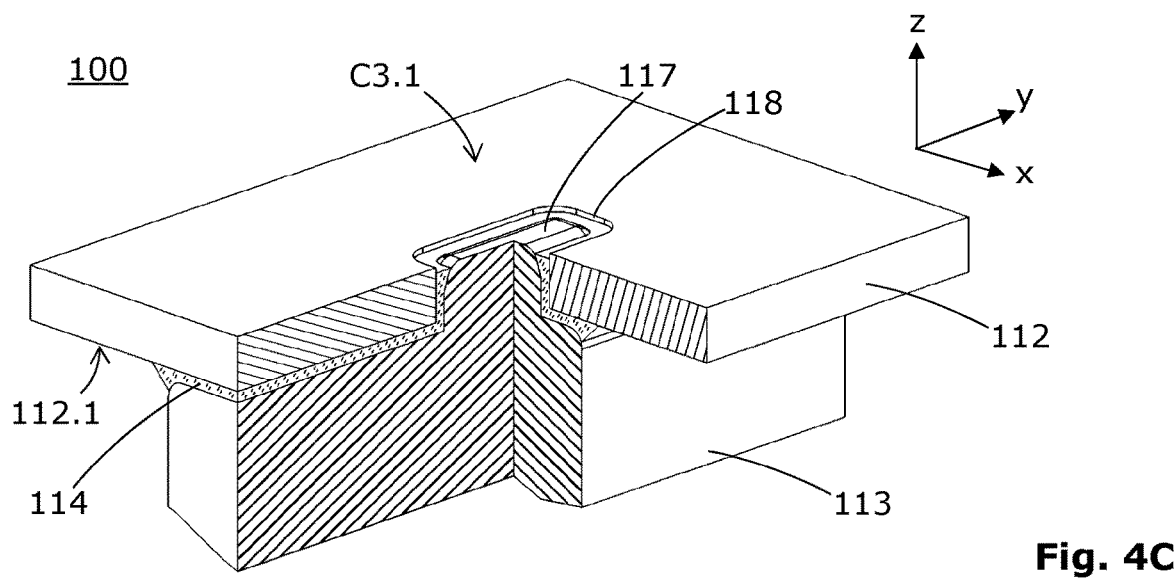
FIG. 4C schematically shows a perspective cross-section of the apparatus of FIG. 4A, 4B in the assembled state.

FIGS. 4A-4C show one 3-dimensional engaging structure C3.1 of a further embodiment. In this embodiment, the 3-dimensional engaging structure C3.1 comprises a post 117 which is protruding from the metal contact surface 113.1. The post 117 in this embodiment has a rectangular footprint in the x-y-plane. The corners/edges of the post 117 might be chamfered, for example. FIG. 4B shows further details of the apparatus 100. In FIG. 4B one can see the portion of the 3-dimensional injection molded layer 113 which carries the post 117 and one can see a portion of the metal layer 112 which comprises a hole 118. This hole 118 has a complementary shape so that the post 117 fits inside when the metal layer 112 and the layer 113 are joined. Preferably, there is a small circumferential air gap between the post 117 enveloping surface and the inner surface of hole 118. FIG. 4B also shows the shape which the bonding agent 114 assumes inside the gap when it is hardened or cured during the assembly process. FIG. 4B indicates that the bonding agent 114, which is liquid when applied, conforms to all elements and features of the upper metal contact surface 113.1 of the layer 113 and to the lower metal contact surface 112.1 of the layer 112. FIG. 4C, which shows the elements and features of this apparatus 100 in the assembled state (after the bonding agent was hardened or cured), shows that bonding agent 114 conforms to all elements and features of the upper metal contact surface 113.1 and the lower metal contact surface 112.1. It therefore locks the pin 117 inside the structure of contact partner 112 very firmly.

FIG. 5A schematically shows a perspective exploded view of a portion of a 3-dimensional injection molded layer 113 and a metal layer 112 of apparatus 100 which comprises another 3-dimensional engaging structure C3.2. In order to achieve a robust, yet compliant fit between features of the two contact partners CP1, CP2 (layers 112, 113), the combination of a circular (slightly conical) post 117 and a circular-arc based trifold rotation symmetric hole 118 is proposed. FIG. 5B shows a cross-section of the apparatus 100 of FIG. 5A in the assembled state. The bonding agent 114 is not shown in FIG. 5A, 5B, 5C.

The post 117 might sit in the middle of a circular cavity 132, as illustrated in FIG. 5A. This allows for rubbed-off particles and locally deformed post 117 surface areas to be caught inside the resulting circular ditch, instead of getting in between contact partners 112 and 113 and inhibiting the proper closure.

In FIG. 5B it can be observed, that there is a physical contact, compression and deformation of the post 117 on the left side, where one circular arc constituting hole 118 cuts into the outer diameter of post 117. On the opposite (right) side, there is an air gap. Due to the trifold rotation symmetry of the hole 118, the radial compression forces acting onto the circular post are spaced at 120° with respect to the post axis and each other. Therefore they exactly balance. This results in highly accurate centering of both contact partners.

Figure 6A:
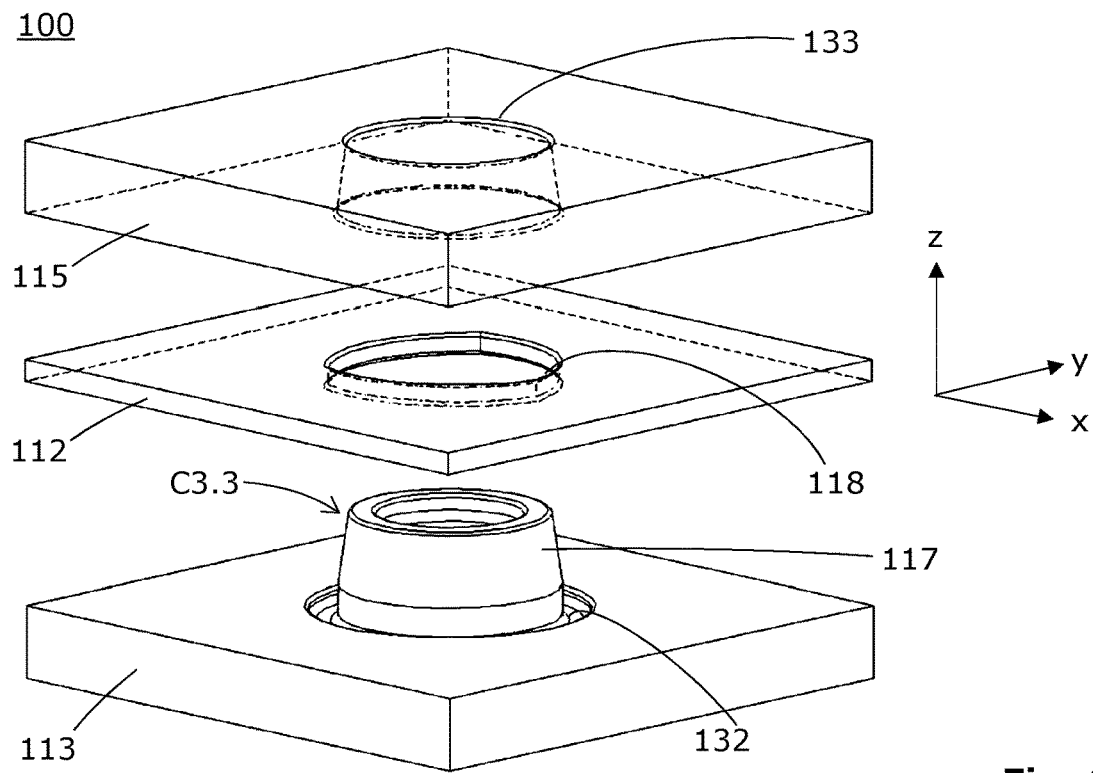
FIG. 6A schematically shows a perspective exploded view of another apparatus comprising a first 3-dimensional injection molded layer, an intermediate metal layer, a second 3-dimensional injection molded layer, and one 3-dimensional engaging structure.

FIG. 6A schematically shows a perspective exploded view of another apparatus 100 comprising a first 3-dimensional injection molded layer 113, an intermediate metal layer 112, a second 3-dimensional injection molded layer 115, and one 3-dimensional engaging structure C3.3. In order to obtain a robust and compliant fit between features of these three contact partners CP1, CP2, CP3 (layers 112, 113, 115), the combination of a circular (slightly conical) post 117, a circular-arc based trifold rotation symmetric hole 118, and a circular cross section, conical hole 133 is proposed. The post 117 of FIG. 6A might optionally sit in the middle of a circular cavity 132, too.

Figure 6B:
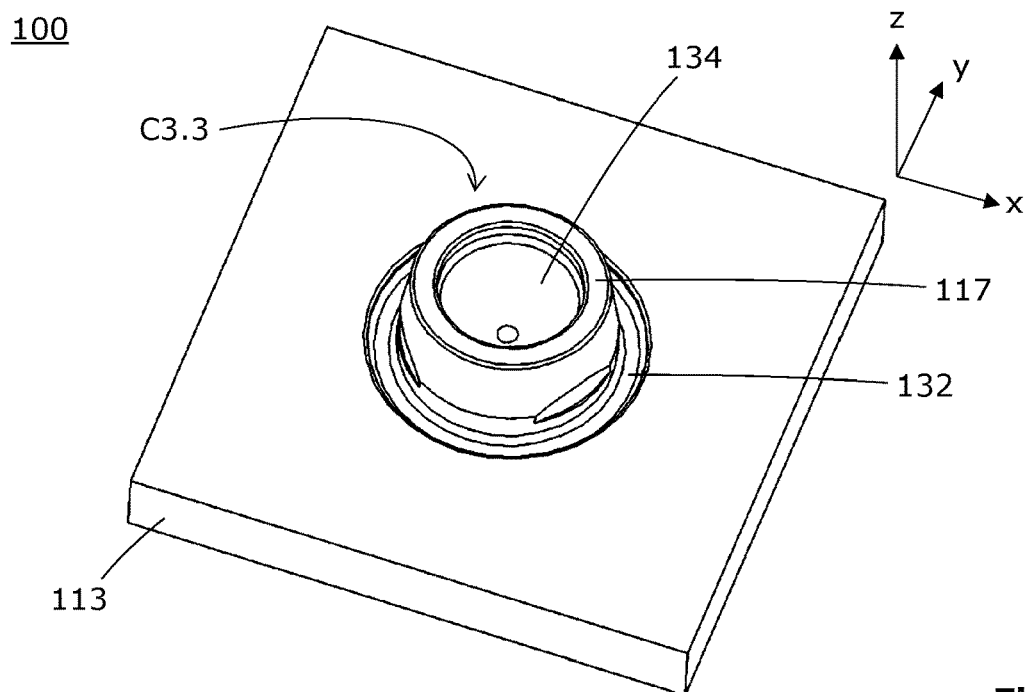
FIG. 6B schematically shows a perspective top view of the first 3-dimensional injection molded layer of the apparatus of FIG. 6A.

FIG. 6B shows the layer 113, the integrated post 117, and the optional circular cavity 132. As one can see in FIG. 6B, the post 117 might comprise a central circular cavity 134, in order to conform with plastic molding piece-part design rules (to avoid bulk material agglomeration) and to increase mating compliance between layers 113 and 115.

Figure 6C:
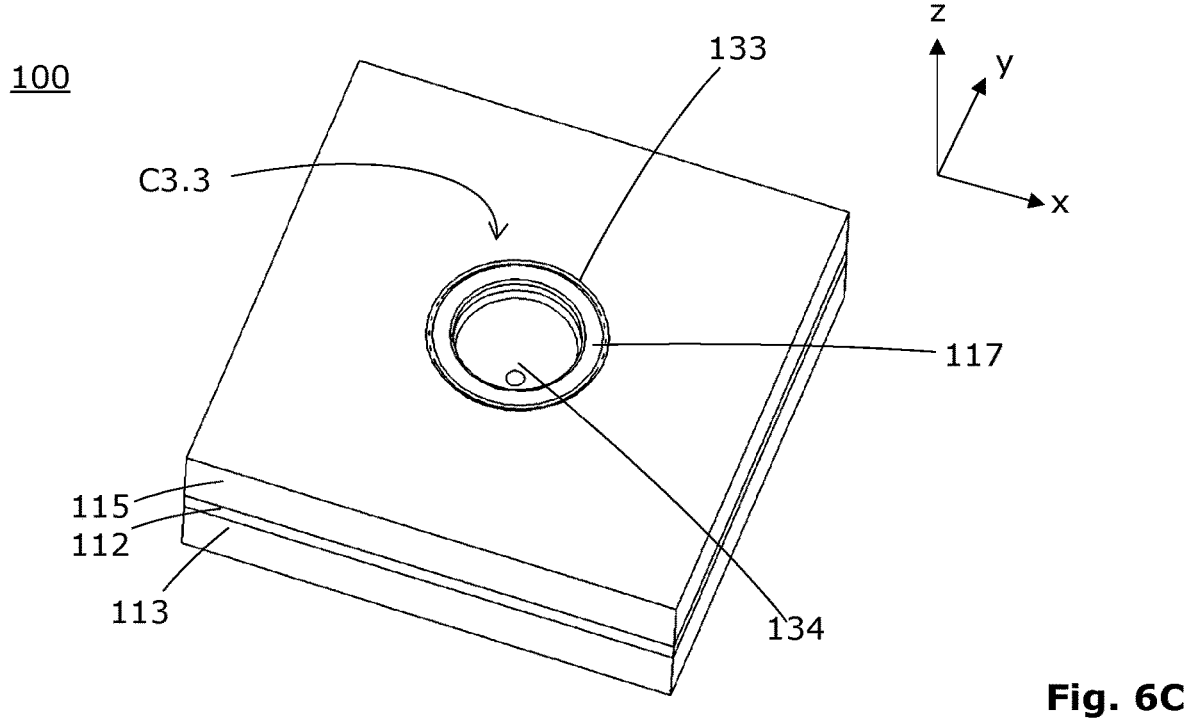
FIG. 6C schematically shows a perspective top view of the apparatus of FIG. 6A in the assembled state.
Figure 6D:
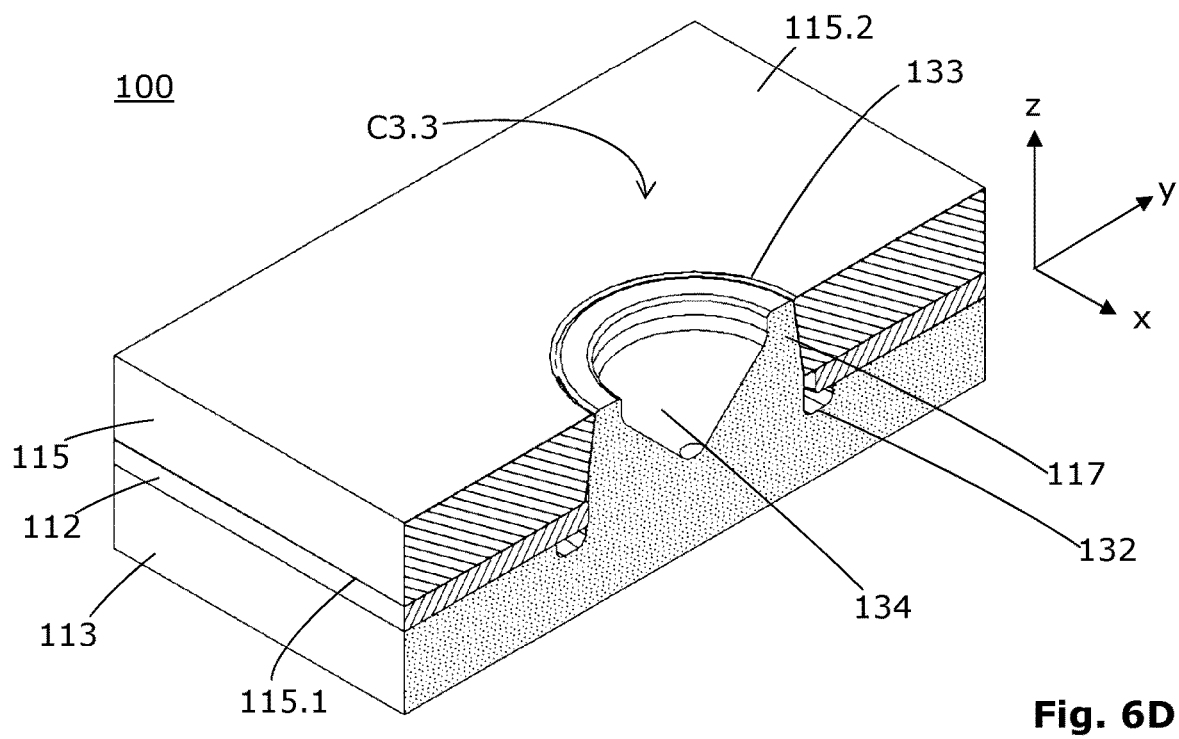
FIG. 6D schematically shows a cross-section of the apparatus of FIG. 6A in the assembled state.

FIG. 6C schematically shows a perspective top view and FIG. 6D a cross-section of the apparatus 100 of FIG. 6A in the assembled state.

Figure 12:
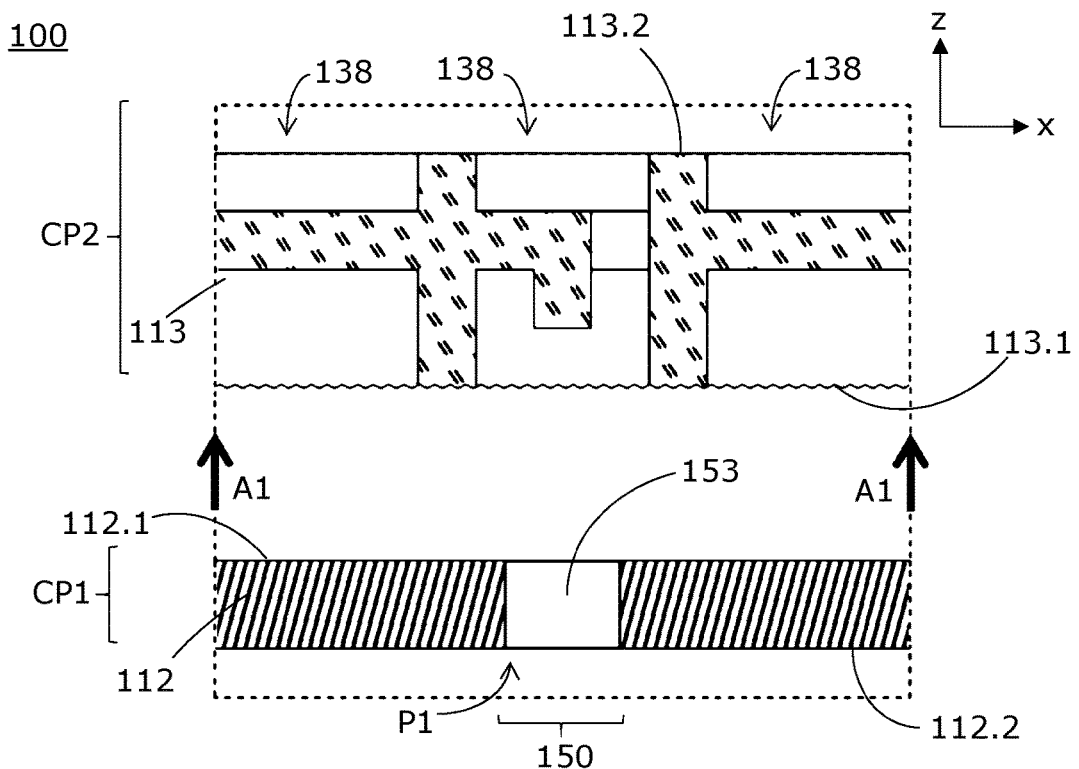
FIG. 12 schematically shows an exploded cross-section of an antenna embodiment comprising at least one injection molded layer and one metal layer.

In a first antenna embodiment (cf. FIG. 12), the apparatus 100 comprises a metal layer 112 (e.g. a bulk metal body) with at least one metal contact surface 112.1. In this embodiment, the metal layer 112 (in connection with this embodiment referred to as first contact partner CP1) comprises at least one passing aperture 153 serving as signal port P1 for an HF-signal. This apparatus 100 further comprises at least one injection molded layer 113 (in connection with this embodiment referred to as second contact partner CP2) with at least one metal contact surface 113.1. This injection molded layer 113 is designed so as to combine signal routing and radiation/reception functions of the first antenna embodiment. The injection molded layer 113 might for example comprise a single-ridged waveguide on its lower face 113.1 and slot-based radiator structures 138 arranged in its upper face. The slot-based radiator structures 138 are designed for transmitting/receiving microwaves. The arrows A1 in FIG. 12 are used to show the mounting direction when joining the two contact partners CP1 and CP2.

Figure 9:
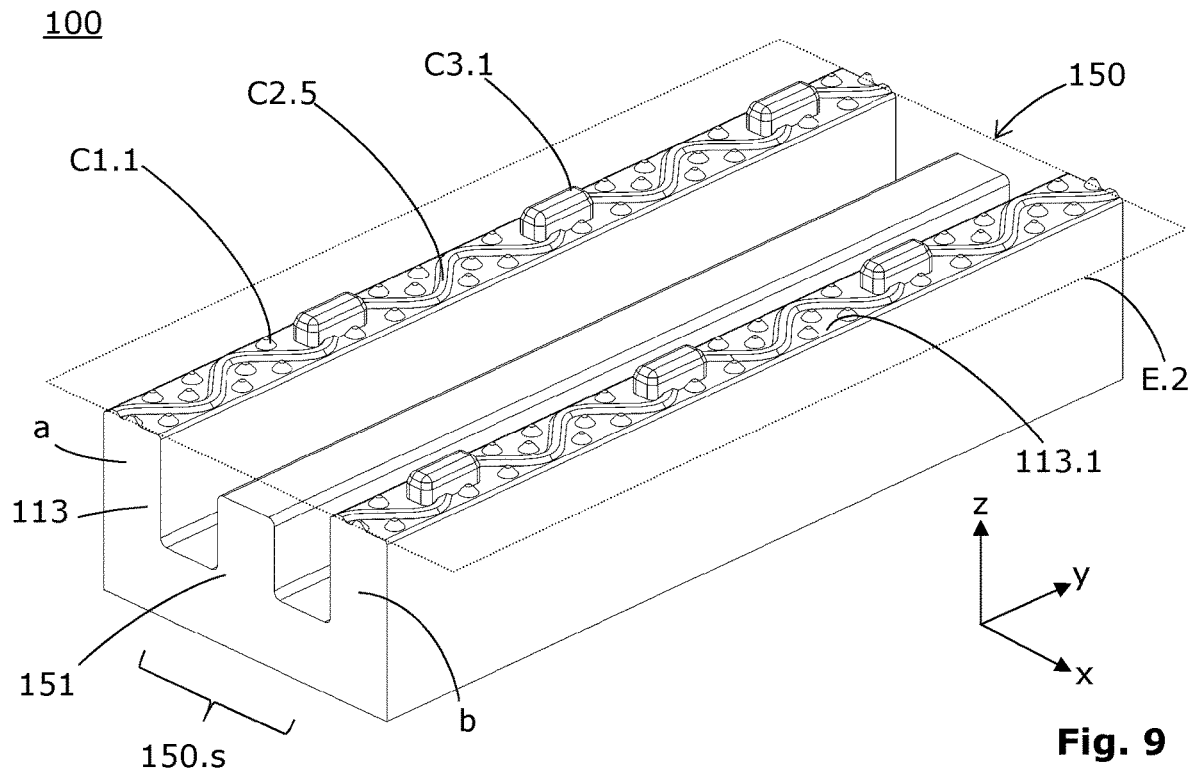
FIG. 9 schematically shows a perspective top view of another apparatus comprising deformable microstructures, limit stop structures, and 3-dimensional engaging structures (C3)

FIG. 9 shows the lower face 113.1 of such an injection molded layer 113 with three parallel ridges, where the ridge 151 in the middle has a smaller height (parallel to the z-axis) than the two outer ridges. The two outer ridges (or walls) a, b, have a longitudinal extension parallel to the y-axis and have a height (parallel to the z-axis) greater than the height of the ridge 151 of the waveguide 150.s. These outer ridges define a plane E.2. The plane E.2 is oriented parallel to the x-y-plane. This apparatus 100 further comprises a plurality of deformable microstructures C1.1, one wave-shaped limit stop structure C2.5 per outer ridge, and three 3-dimensional engaging structures C3.1 per outer ridge.

Figure 10A:
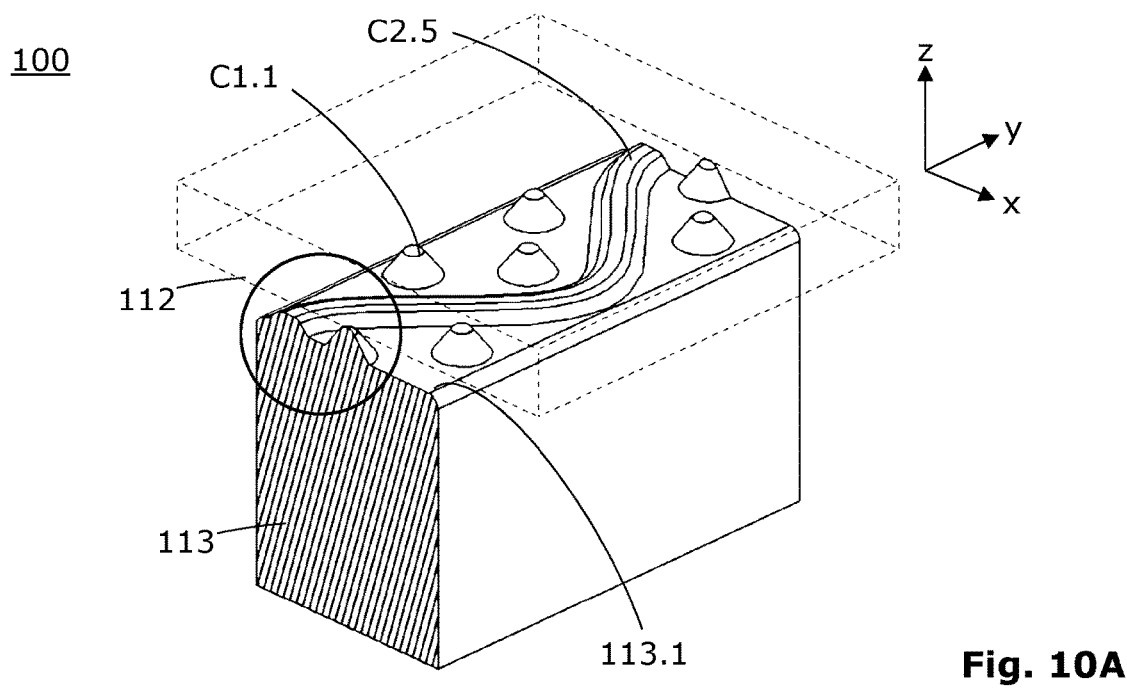
FIG. 10A schematically shows a perspective top view of another apparatus comprising a 3-dimensional injection molded layer with deformable microstructures and a limit stop structure (similar to FIG. 8)
Figure 10B:
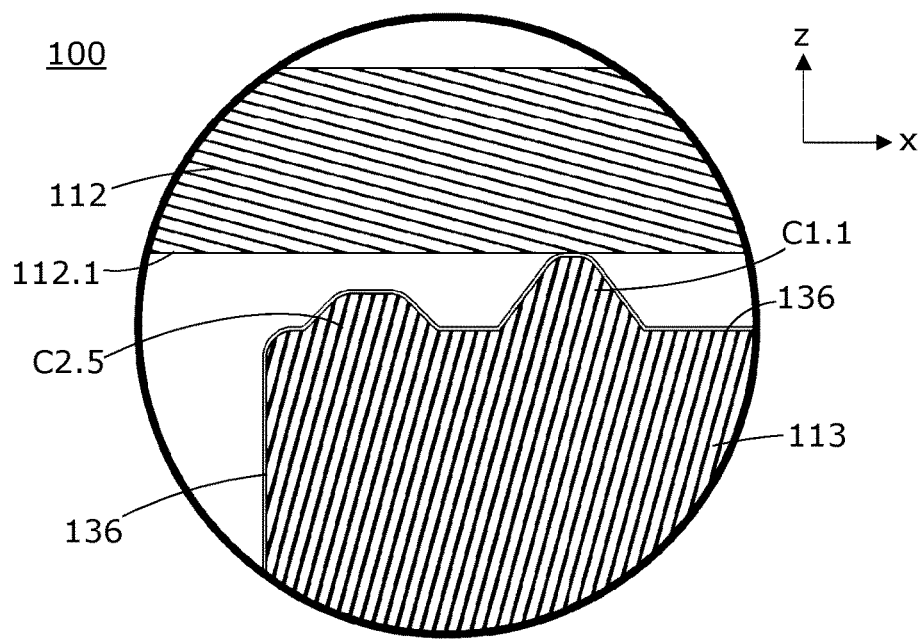
FIG. 10B schematically shows an enlarged view of FIG. 10A.
Figure 10C:
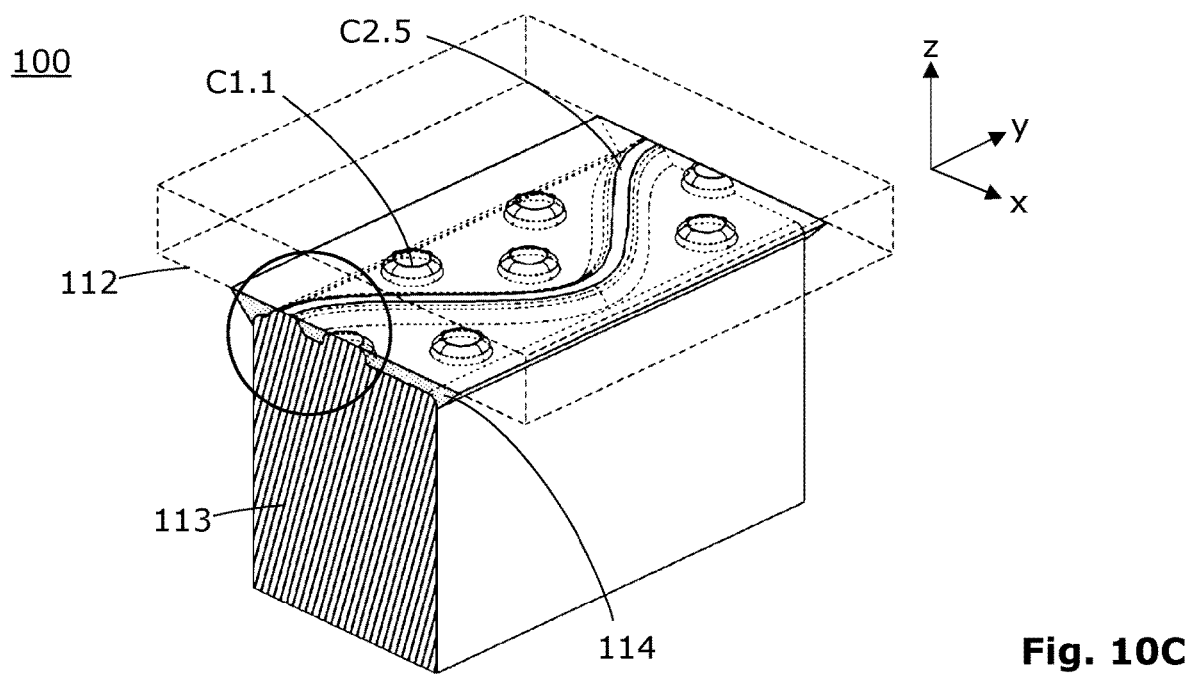
FIG. 10C schematically shows the apparatus of FIG. 10A after the metal layer and the injection molded layer have been pressed against each other.

FIG. 10A-10C schematically show details of another apparatus 100 comprising a 3-dimensional injection molded layer 113 with deformable microstructures C1.1 and a limit stop structure C2.5 (similar to FIG. 8). In FIG. 10A one can see the part of the metal layer 112 situated above the 3-dimensional injection molded layer 113. The bonding agent 114 is not shown and the two layers 112 and 113 have not yet been pressed against each other. That is, FIG. 10A shows a state prior to carrying out the steps of the assembling process.

FIG. 10B shows an enlarged section of FIG. 10A. The metal contact surface 112.1 of the layer 112 is positioned right on the apex of the yet undeformed microstructure C1.1. The metallization 136 of the 3-dimensional injection molded layer 113 is a very thin layer covering the layer 113 and its apex-near portion is pinched between the layers 112 and 113 bulk materials. The metallization 136 typically has a good adhesion to the surface of layer 113 surface, but this is of minor importance for its integrity throughout the joining and contacting process of at least some embodiments, if it has certain minimum thickness and ductility (as e.g. provided by copper and silver, within limits also with electroplated nickel).

FIG. 10C schematically shows details of the apparatus 100 after the bonding agent 114 was applied and after the uniaxial pressure has been applied to firmly press the two layers 112, 113 against each other. One can see in this Figure that the deformable microstructures C1.1 have changed their shape.

Figure 10D:
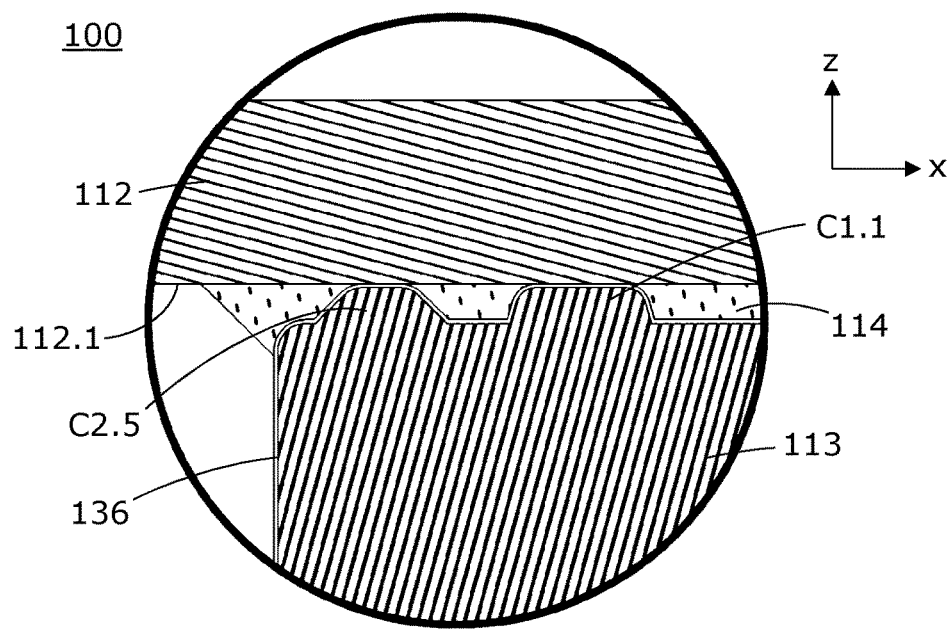
FIG. 10D schematically shows an enlarged view of FIG. 10A.

FIG. 10D shows an enlarged section of FIG. 10C. The metal layer 112 is now positioned right on the top land of the limit stop structures C2.5. After the pressure was applied and the deformable microstructures C1.1 have been compressed, the metallization 136 still confines to the surfaces of the layer 113 and to all its surface features.

By comparing FIGS. 10B and 10D, one can determine that the foot diameter (foot print) of the deformable microstructures C1.1 has not changed. This is due to the fact that the deformable microstructures C1.1 are integral features of the layer 113. The volume of these deformable microstructures C1.1 cannot change, if the layer 113 bulk is incompressible (which will be the case with standard injection molding materials and processes, with the exception of pressurized gas injection or molded foam material). Just their height was reduced and their upper diameter has increased. The specific deformation behavior of the cone-shaped deformable microstructures C1.1 is important since it guarantees that the metallization 136 (which is a very thin metal layer) is not ripped or torn open during the pressure bonding step. There are truncated cone aspect ratios and sidewall angles (in undeformed, as injection molded state), which yield an almost constant surface area under the condition of constant volume plastic deformation of the individual cones/microstructures. Such a dimensioning is preferred, since it guarantees minimum stress during contact establishing metal layer deformation.

Figure 13:
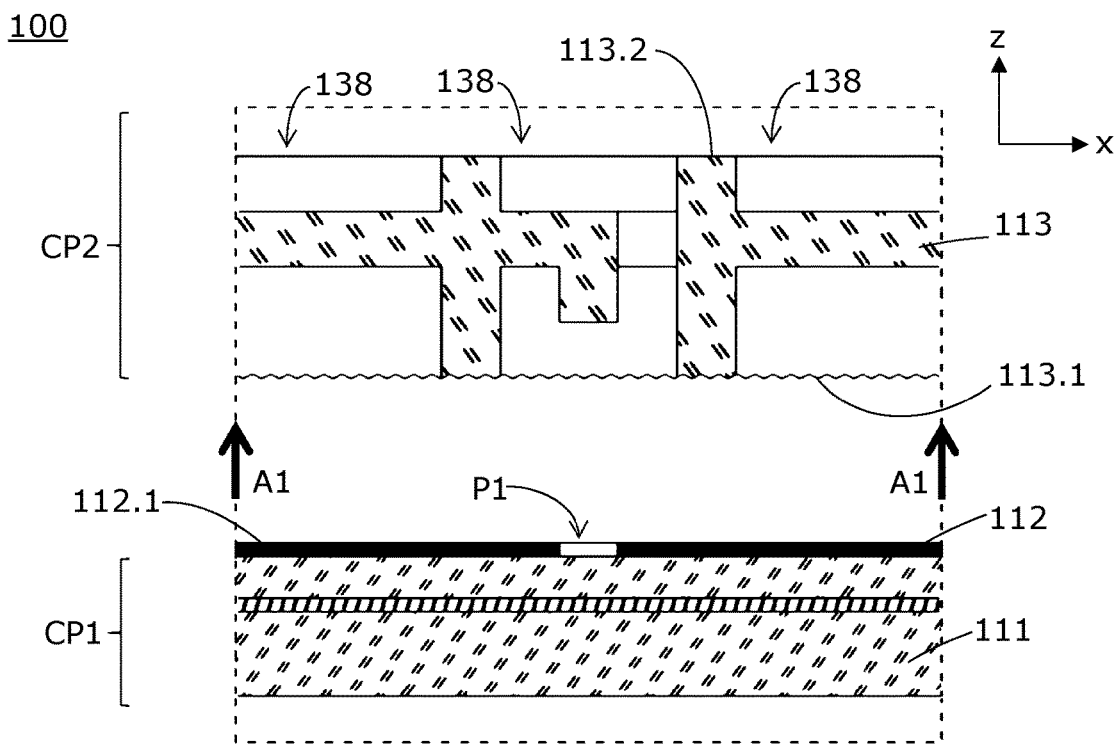
FIG. 13 schematically shows an exploded cross-section of an antenna embodiment comprising at least one injection molded layer and one metal layer on top of a PCB.

In a second antenna embodiment, the apparatus 100 (cf. FIG. 13) comprises a thin metal layer 112 on top of a printed circuit board 111 (PCB) with at least one metal contact surface 112.1. The thin metal layer 112 might for instance serve as ground plane of an SIW (substrate-integrated waveguide) realized in said PCB 111. The thin metal layer 112 of the PCB 111 defines the metal contact surface 112.1 of the first contact partner CP1. The PCB 111 with the thin metal layer 112 is brought in contact with an injection molded layer 113 (referred to as second contact partner CP2) with at least one metal contact surface 113.1. The injection molded layer 113 of the first antenna embodiment (cf. FIG. 12) can be used in connection with the second antenna embodiment (cf. FIG. 13), for example. The PCB 111 might comprise holes (not shown in FIG. 13) which are designed and arranged so as to receive 3-dimensional engaging structures C3.1. The injection molded layer 113 of this second antenna embodiment might for example comprise slot-based radiator structures 138 arranged in its upper face 113.2. The arrows A1 in FIG. 13 are used to show the mounting direction when joining the two contact partners CP1 and CP2.

Figure 14:
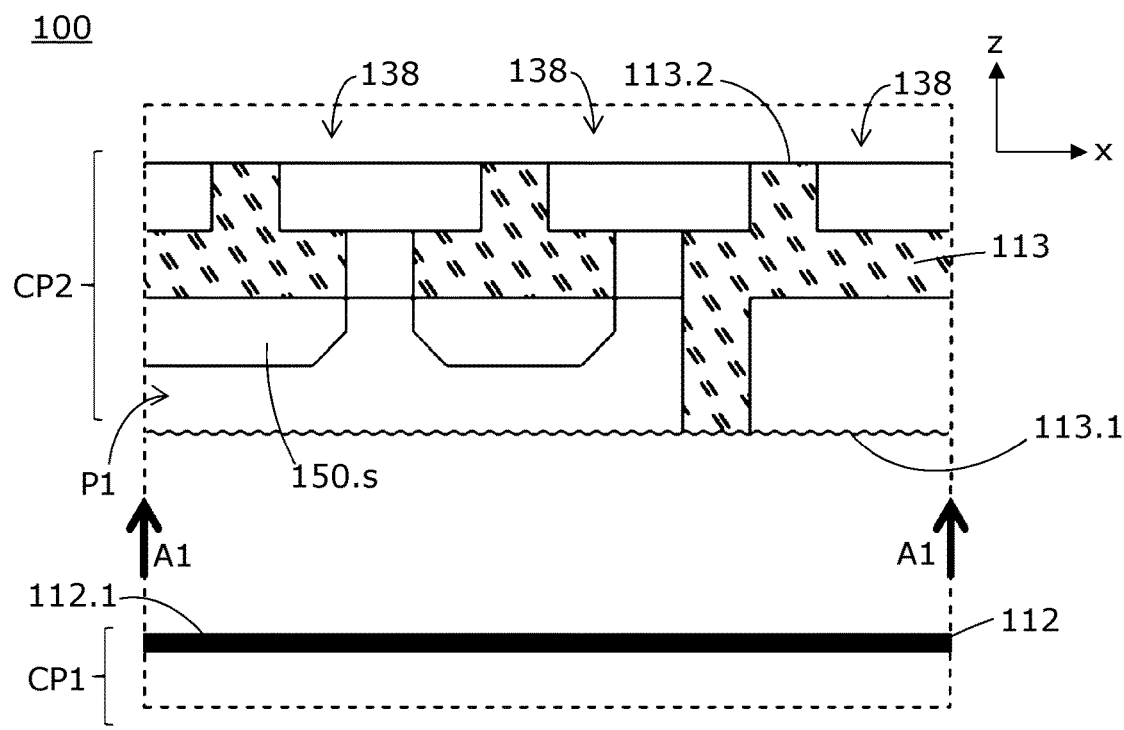
FIG. 14 schematically shows an exploded cross-section of an antenna embodiment comprising at least one injection molded layer and one metal layer.

In a third antenna embodiment, the apparatus 100 (cf. FIG. 14) comprises a metal sheet serving as metal layer 112 (referred to as first contact partner CP1) and an injection molded layer 113 (referred to as second contact partner CP2) which comprises at least one waveguide duct as port P1. As can be seen in FIG. 14, the signal port P1 is accessible from the narrow side wall of the assembled layer stack and may be realized as single-ridge waveguide 150.$s$. The injection molded layer 113 of this third antenna embodiment might for example comprise slot-based radiator structures 138 arranged in its upper face 113.2. The arrows A1 in FIG. 14 are used to show the mounting direction when joining the two contact partners CP1 and CP2.

Figure 15:
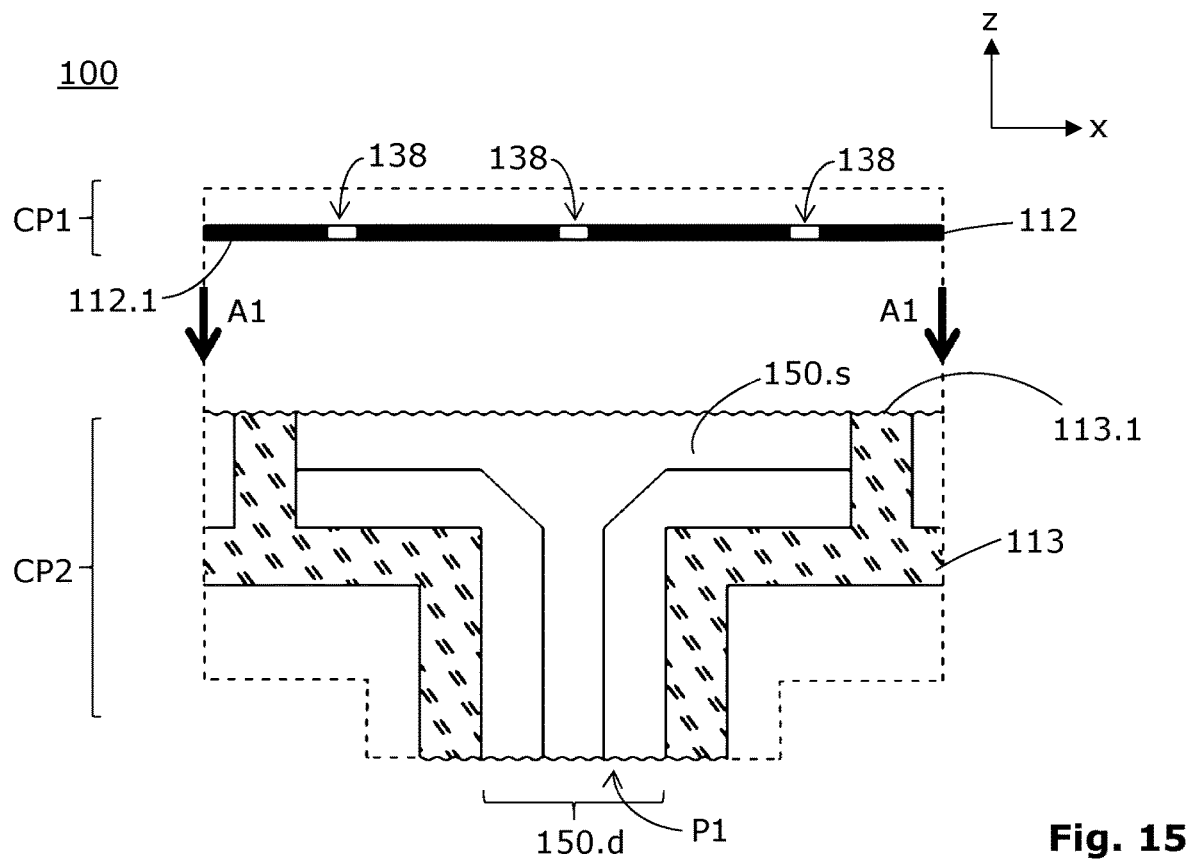
FIG. 15 schematically shows an exploded cross-section of an antenna embodiment comprising at least one injection molded layer and one metal layer.

In a fourth antenna embodiment, the apparatus 100 (cf. FIG. 15) comprises an injection molded layer 113 (referred to as second contact partner CP2) which has at least one hollow waveguide serving as signal port. Preferably, in this embodiment a double-ridged waveguide 150.$d$ extending parallel to the z-axis serves as signal port P1. The signal port P1 provided by the hollow waveguide 150.$d$ might be used in order to connect to a signal processing system block (not shown) positioned below the layer stack of the fourth antenna embodiment. The injection molded layer 113 in this embodiment comprises a structured metal contact surface 113.1 which forms an essential part of a planar signal distribution and routing network. The planar signal distribution and routing network might be completed by closure of a single-ridged waveguide portion 150.$s$ with a metal sheet 112 serving as first contact partner CP1. The metal sheet 112 in this embodiment might further comprise radiating and/or receiving slots 138, for example. The example shown in FIG. 15 has only exemplary short sections of single-ridge waveguides extending in two opposite directions and feeding 3 radiating slots (one central, one per branch). It goes without saying, that the single-ridge waveguide ducts can be made much longer, and a higher number of serially fed radiating slots (>1 per branch) can be implemented. Also, 1- or 2-dimensional (quasi-planar) corporate feed networks can be arranged in the single signal distribution layer (parallel to the x-y plane) of this embodiment, where layer 112 covers and closes electrically all waveguides simultaneously and provides e.g. for a 2-dimensional radiating slot antenna array.

In at least some embodiments, the metal layer 112 comprises a 2D structure. A "2D structure", for the present purpose, is a structure which is obtained by a virtual "extrusion" of a 2D-pattern along the z-axis. That is, the 2D structure is a 3-dimensional mapping of the 2D-pattern into the metal material of the metal layer 112. The boundaries of the 2D-pattern might continuously or step-by-step expand or contract normal to the boundary lines. In other words, a "2D structure", for the present purpose, is a structure which extends through the metal material of the metal layer 112.

In a fifth antenna embodiment (cf. FIG. 11), the apparatus 100 comprises a first injection molded layer 115 (referred to as first contact partner CP1) and a second injection molded layer 113 (referred to as second contact partner CP2). The first injection molded layer comprises an essentially flat contact surface 115.1. The second injection molded layer 113 comprises at least one signal port P1 formed by a hollow waveguide duct (normal to the x-y-plane). The apparatus 100 of FIG. 11 comprises a double ridged waveguide 150.$d$ serving as waveguide. The at least one signal port P1 provides a signal distribution function preferably by means of (single-) ridged waveguide structures 150.$s$ residing on an upper face 113.1 (referred to as metal contact surface) of the layer 113. The upper face 113.1 carries a plurality of deformable microstructures C1.1, limit stop structures C2.$i$ and/or 3-dimensional engaging structures C3.1, which are here symbolized by means of a wavy surface line in FIG. 11. The lower face of the layer 113 can be structured for mechanical purposes and/or for electrical purposes (e.g. shielding lids or chambers for electronic circuitry). The lower face might comprise a honey-comb-structure and/or a cross-hatched thin wall structure. The apparatus 100 of the fifth antenna embodiment of FIG. 11 comprises a lower face 113.2 which is, like the upper face 113.1, provided with deformable microstructures or combination of deformable microstructures, limit stop structures and 3-dimensional engaging structures.

Figure 11:
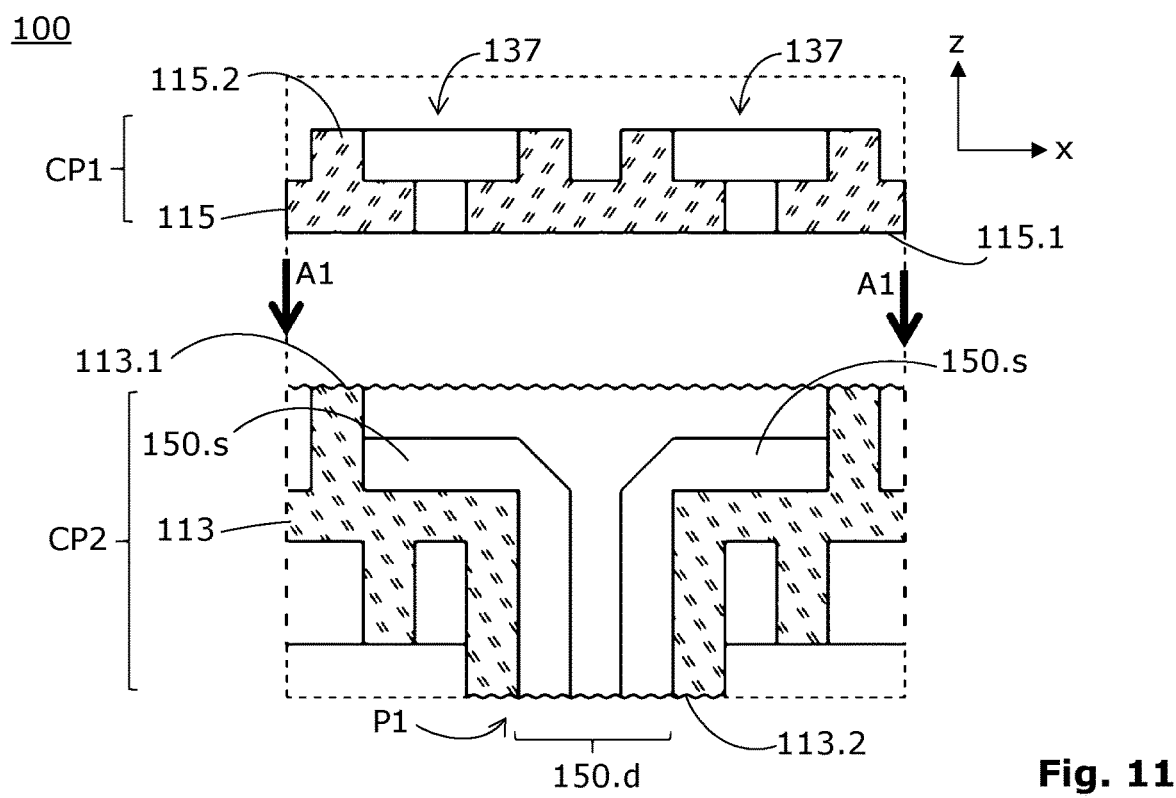
FIG. 11 schematically shows an exploded cross-section of an antenna embodiment comprising at least two injection molded layers.

The lower face 115.1 of the layer 115 is metallized for being contacted by the deformable microstructures of the upper face 113.1 when the two layers 113, 115 are being pressed against each other. The apparatus 100 of FIG. 11 further comprises antenna front cavities 137, which are designed for transmitting/receiving microwaves (e.g. radar waves). The arrows A1 in FIG. 11 are used to show the mounting direction when joining the two contact partners CP1 and CP2.

The lower face 115.1 of the layer 115 is representing a relatively hard surface to the deformable microstructures present on face 113.1 of layer 113, although it might have been produced from the same material as layer 113, if it is predominantly flat. In this case, ceramic particles and glass fibers used as compounding or filling material are present shortly below the surface and fulfill their purpose. Thus, negligible deformation takes place on surface 115.1, while microstructures present on surface 113.1 are compressed and partially plastically deformed due to the local depletion of filling material. The same effect can be achieved by reversing the principle and providing the microstructures also, or exclusively, on the surface 115.1 of layer 115. In fact, the distribution of deformable microstructures, limit stop structures and 3-dimensional engaging structures (protruding parts and complimentary recesses) to both injection molded layers 113, 115 of such contact partner pairing is arbitrary and can be chosen for convenience, ease of fabrication or other criteria.

After the assembly process, the upper face 113.1 of the layer 113 is closed by the lower face 115.1 of the second injection molded layer 115.

The two injection molded layers 113 and 115 of the fifth antenna embodiment facilitate a subdivision of task/functionalities between the two stacked layers 113 and 115. This provides for design flexibility in the sense that ridges and sidewalls constituting the ridged waveguide structure can be arbitrarily assigned to the first injection molded layer 113 or to the second injection molded layer 115.

The second injection molded layer 115 of the fifth antenna embodiment might provide a face 115.2, which either is flat or structured to support beam forming by optionally comprising walls, flares, horns and the like.

Figure 16:
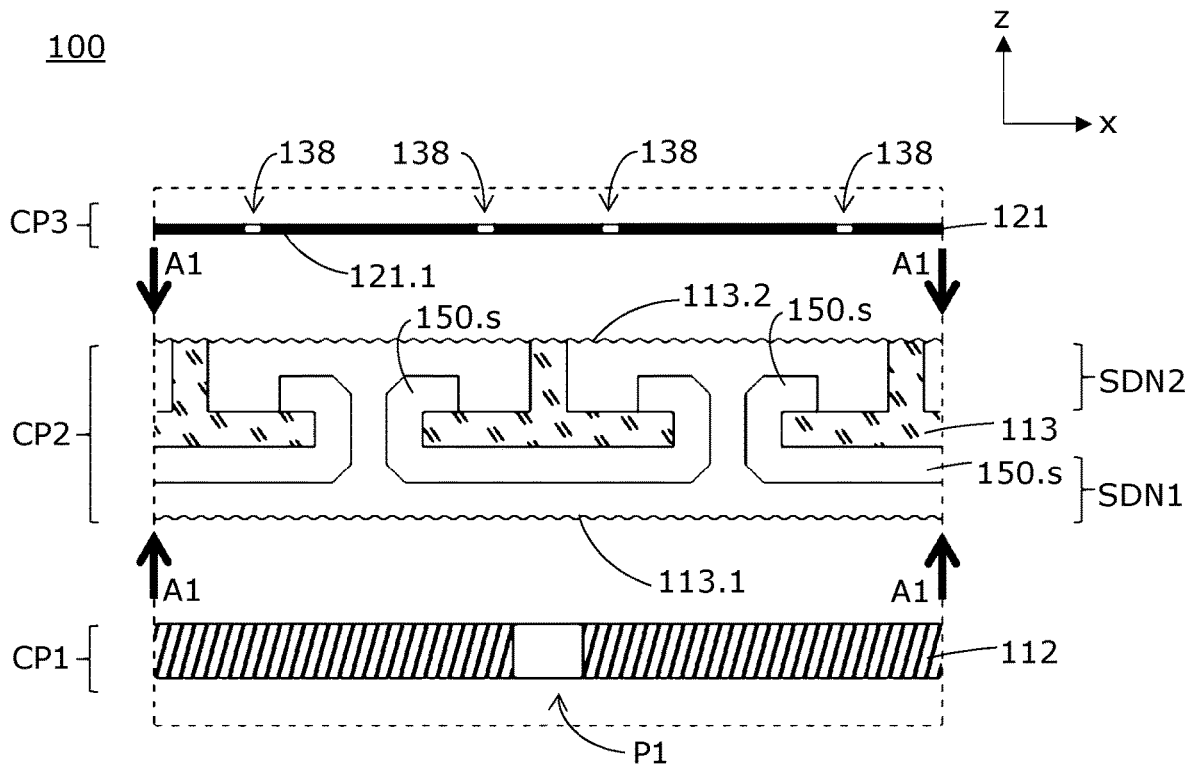
FIG. 16 schematically shows an exploded cross-section of an antenna embodiment comprising at least one injection molded layer and one metal layer.

In a sixth antenna embodiment (cf. FIG. 16), the apparatus 100 comprises an injection molded layer 113 (referred to as intermediate contact partner and in this context referred to as CP2) being assembled between two metal layers, layer 112 (referred to as first contact partner CP1) and metal layer 121 (referred to as third contact partner CP3. In this embodiment, the metal layer 112 comprises at least one passing aperture serving as signal port P1 for an HF-signal. The injection molded layer 113 comprises a lower structured surface serving as independent first signal distribution network SDN1. This signal distribution network SDN1 preferably comprises at least one single-ridged waveguide 150.s closed by the conductive surface of the metal layer 112. The injection molded layer 113 further comprises an upper structured surface serving as a second signal distribution network SDN2, and is at least partially serving as supporting structure for slot-based radiators 138 of the metal layer 121. The second signal distribution network SDN2 is preferably constructed by means of single-ridged waveguide duct(s) 150.s inside the injection molded layer 113.

Figure 17:
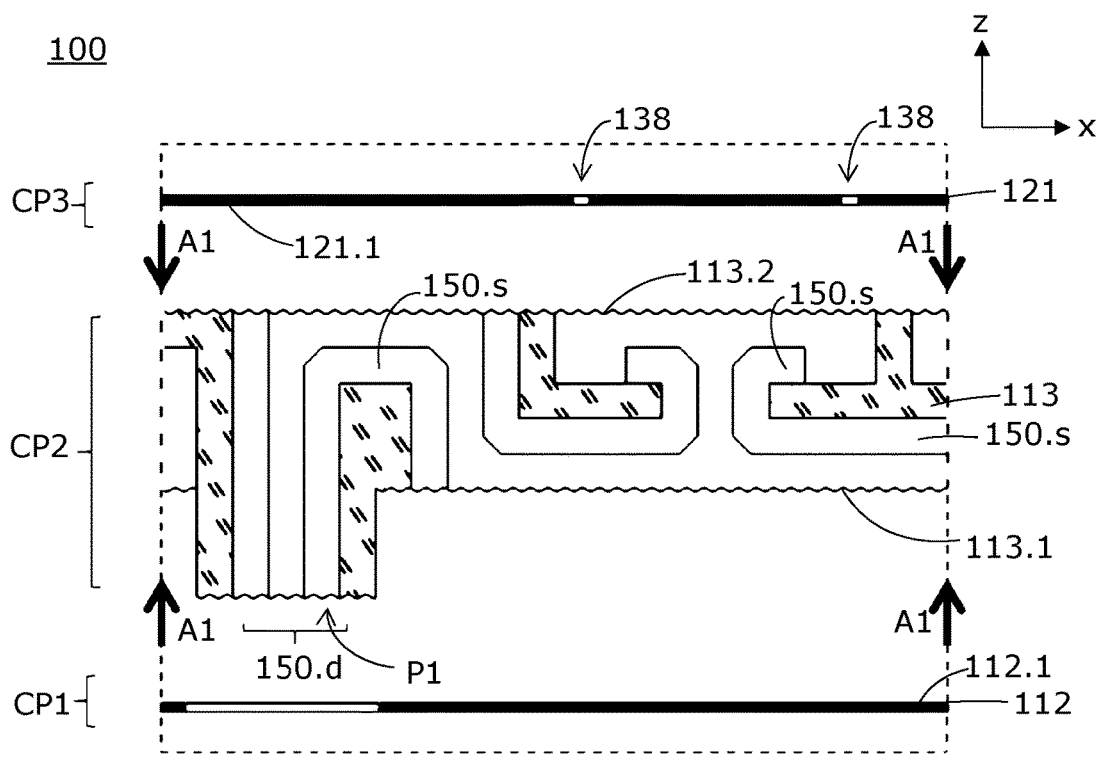
FIG. 17 schematically shows an exploded cross-section of an antenna embodiment comprising at least one injection molded layer and two metal layers.

In a seventh antenna embodiment (cf. FIG. 17), the apparatus 100 comprises an injection molded layer 113 (referred to as second contact partner CP2) being at least partially covered by a metal layer 112 (referred to as first contact partner CP1). The metal layer 112 in this embodiment covers or closes a signal routing waveguide (in this example, single-ridged waveguides 150.s are realized inside the layer 113) being realized on the lower face 113.1 of the injection molded layer 113. The injection molded layer 113 further comprises suitable transitions (e.g. hollow ducts) for vertically attached waveguides (e.g. for a double-ridged waveguide 150.d), as illustrated in FIG. 17. As can be observed in FIG. 17, the double-ridged waveguide primarily connects to the single-ridged waveguide(s) realized on the upper face of layer 113, which is connected to the single-ridged waveguide situated in the lower face 113.1 by a short segment of double-ridged waveguide, in a second step. This technique of routing signals from one surface of layer 113 to the other can be used repeatedly at convenient positions of the x-y plane, to realize complex, multichannel feeding network architectures with signal underpasses and crossings. This waveguide (e.g. the 150.d) serves as HF connection (port P1) to a signal processing apparatus of the seventh antenna embodiment. The respective signal processing apparatus would be situated underneath the layer stack 121, 113, 112 of FIG. 17.

Figure 18:
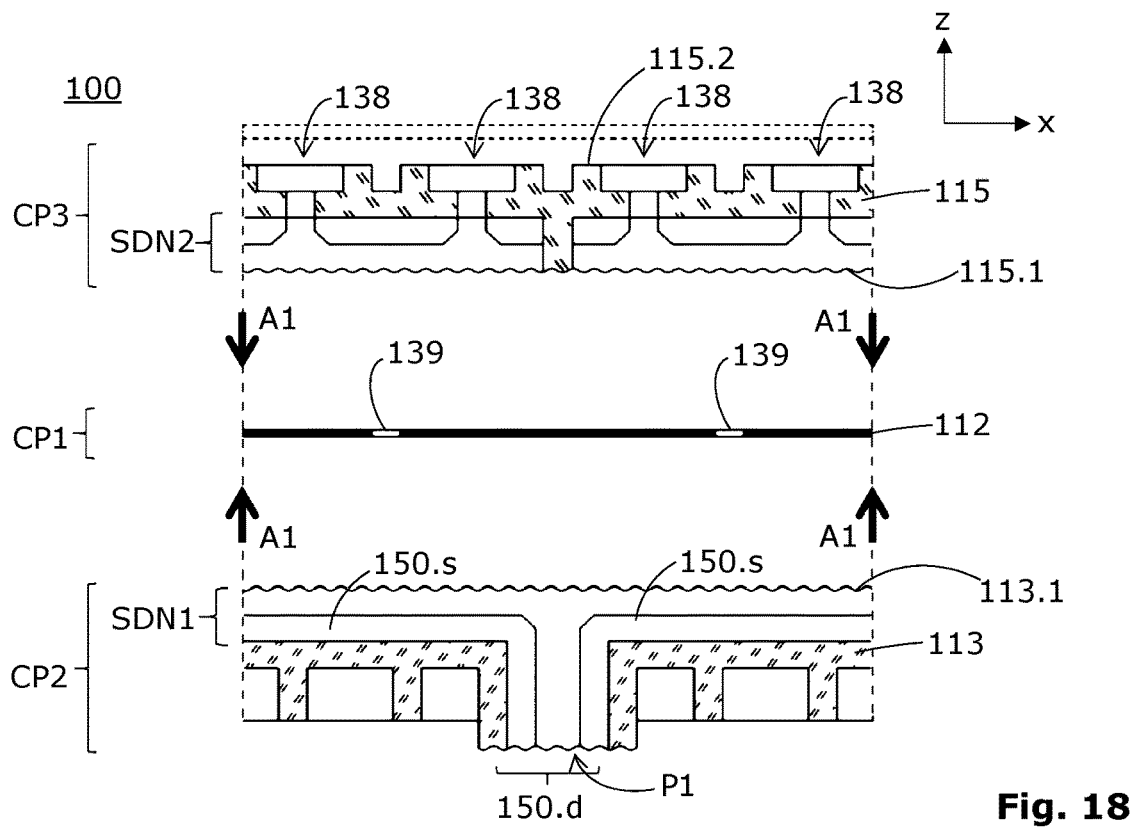
FIG. 18 schematically shows an exploded cross-section of an antenna embodiment comprising at least two injection molded layers and one metal layer.

In an eighth antenna embodiment (cf. FIG. 18), the apparatus 100 comprises a first injection molded layer 113 (referred to as second contact partner CP2) comprising at least one HF signal port P1 and a second injection molded layer 115 (referred to as third contact partner CP3). The injection molded layer 113 in addition might have the same elements or features as the injection molded layer 113 of the fifth antenna embodiment (cf. FIG. 11).

The apparatus 100 of the eighth antenna embodiment further comprises a metal layer 112 (referred to as first contact partner CP1) which covers/closes waveguide ducts and/or resonance cavities being present on the upper face 113.1 of the injection molded layer 113, representing signal distribution network SDN1 or being present on the lower face 115.1 of the injection molded layer 115, representing signal distribution network SDN2. The metal layer 112 of the eighth antenna embodiment is positioned between the first injection molded layer 113 and the second injection molded layer 115.

The metal layer 112 of the eighth antenna embodiment might further comprise openings and/or apertures 139 so as to be able to provide for a local coupling between structures or features on the upper face 113.1 of the first injection molded layer 113 and structures or features on the lower face 115.1 of the second injection molded layer 115. These apertures are a convenient means for concatenating signal distribution network segments present above and below layer 112, which may provide signal underpasses and crossings in this way, in analogy to the seventh antenna embodiment (cf. FIG. 17).

The upper face 115.2 of the second injection molded layer 115 of the eighth antenna embodiment might further comprise structures (not shown) for attaching/fixing a thin radome film and/or structures or features for modifying the radiation characteristics of the eighth antenna embodiment. Radome film or other radiation modifying structures can also be laminated/bonded to the wall faces surrounding radiating apertures 138 by means of electrically isolating bonding agents or pressure-sensitive adhesive (PSA). The same holds for all embodiments comprising a 3-dimensional injection molded layer 113, 115 serving for radiating or receiving microwaves via radiating apertures 138 or antenna cavities 137, whilst the small, predominantly capacitive effect of a thin radome film can be compensated by introducing small changes into the aperture or cavity metal surface geometry.

In a ninth antenna embodiment (cf. FIG. 19), the apparatus 100 comprises one metal layer 112 (first contact partner CP1) and two injection molded layers 113, 115 (second and third contact partners CP2, CP3).

In the ninth antenna embodiment, a bulk metal (cf. FIG. 19) might serve as metal layer 112. The first metal contact surface 112.1 of this metal layer 112 is essentially flat. It is employed to cover or close 3D structures (e.g. single-ridged waveguides 150.s) of the surface 113.1 of the injection molded layer 113. The surface 113.1 comprises a first part of antenna signal distribution network, or SDN1. The injection molded layer 113 has another part of signal distribution network, SDN2, integrated into the upper surface 113.2, and/or it may provide radiating apertures/slot supporting resonant cavities here. The open portions of the structures on the surface 113.2 are covered/closed by the lower surface 115.1 of the injection molded layer 115. The injection molded layer 115 provides microwave radiation and/or reception functions by apertures/openings that are eventually supported by front cavity structures 137 with further, radiation influencing small ridge structures on the upper face 115.2 of the injection molded layer 115 and can be optionally covered/protected by a radome film as described in conjunction with the eighth embodiment, indicated by the parallel pair of dashed lines in FIG. 19.

Figure 20:
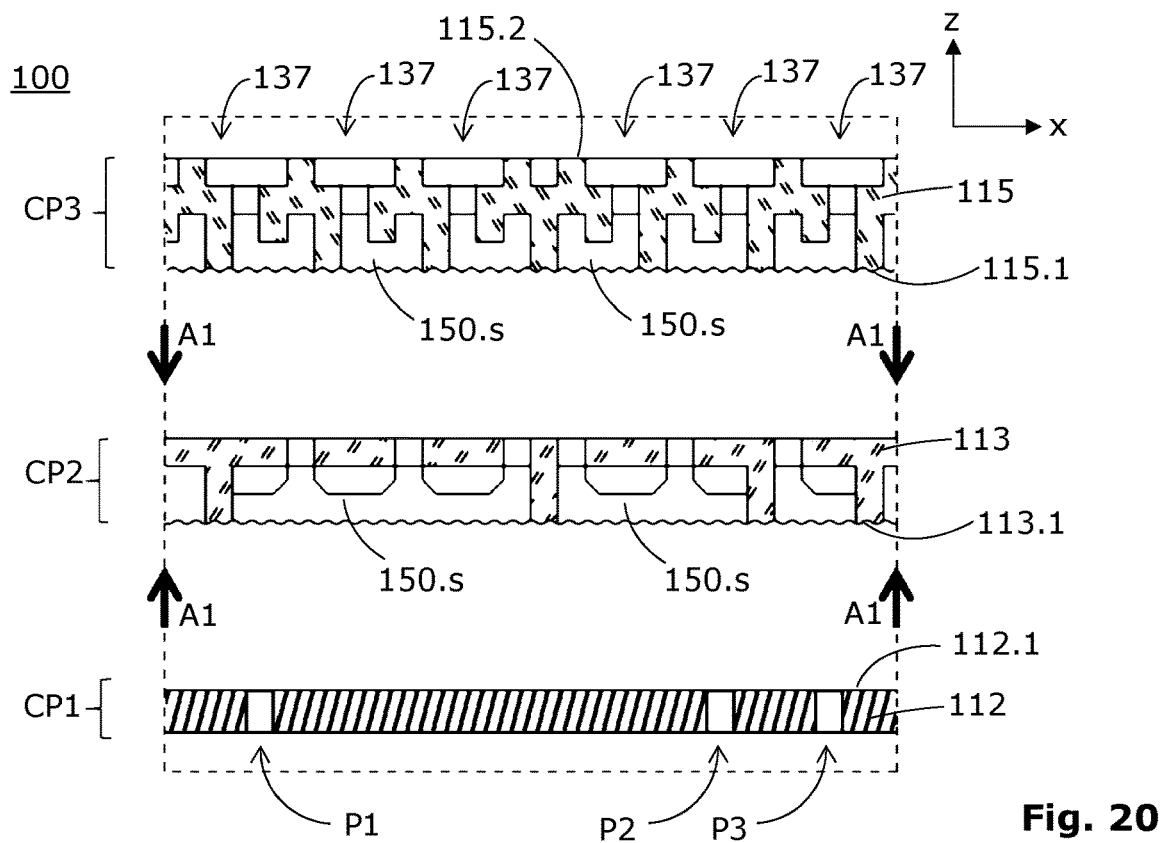
FIG. 20 schematically shows an exploded cross-section of an antenna embodiment comprising at least two injection molded layers and one metal layer.

In a tenth embodiment which comprises two injection molded layers 113, 115 (second and third contact partners CP2, CP3), as shown in FIG. 20, the second injection molded layer 115 might take over the function of signal distribution in the apparatus 100. A metal layer 112 is provided which might comprise several HF ports, e.g. P1-P3. The open portions of the structures on the surface 113.1 are covered/closed by the surface 112.1 of the layer 112. The injection molded layer 115 provides microwave radiation and/or reception functions by apertures/openings that are eventually supported by front cavity structures 137 on the upper face 115.2 of the injection molded layer 115, or are extended/flared open to provide an array composed of short waveguide horns. Signal distribution layer SDN1, realized in surface 113.2 of FIG. 20, shows options for single, double and triple serial couplings to waveguide ducts 150.s present in a second part (SDN2) in the lower face of layer 115. The single ridged waveguides run orthogonal to the paper plane (in +y and −y directions) and can each feed 2 n radiating slots/apertures serially, for example.

Figure 19:
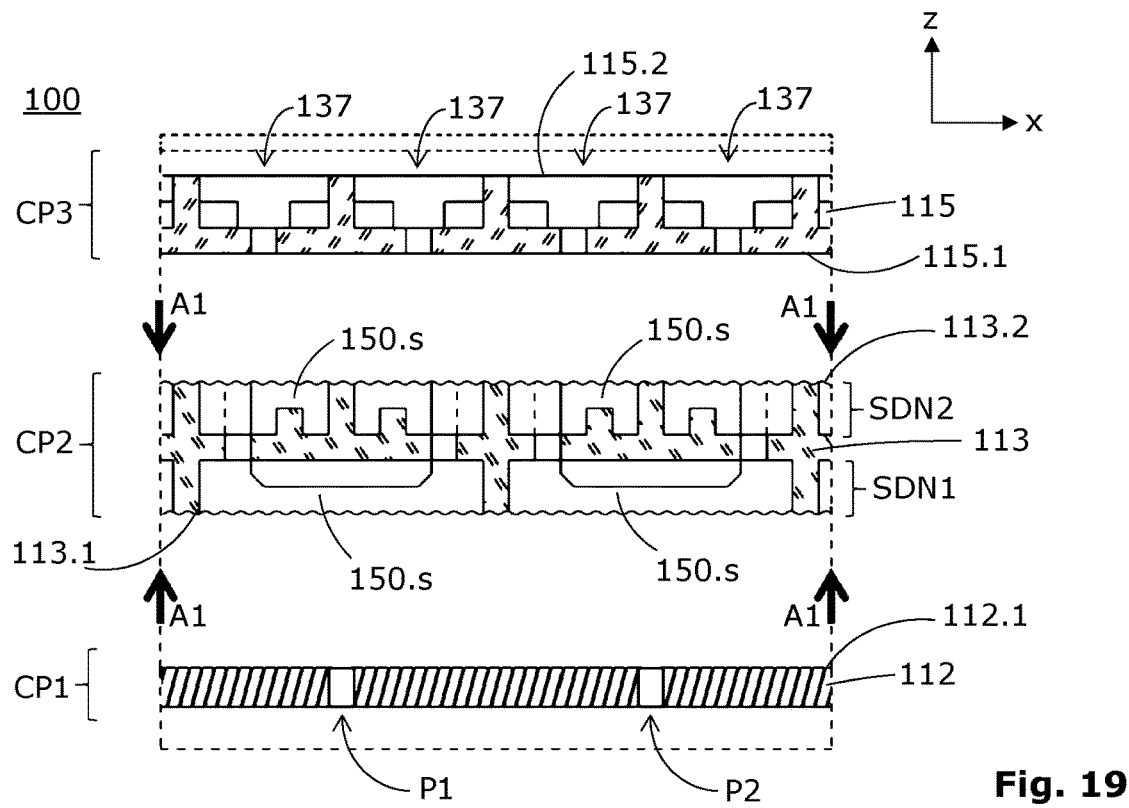
FIG. 19 schematically shows an exploded cross-section of an antenna embodiment comprising at least two injection molded layers and one metal layer.
Figure 21:
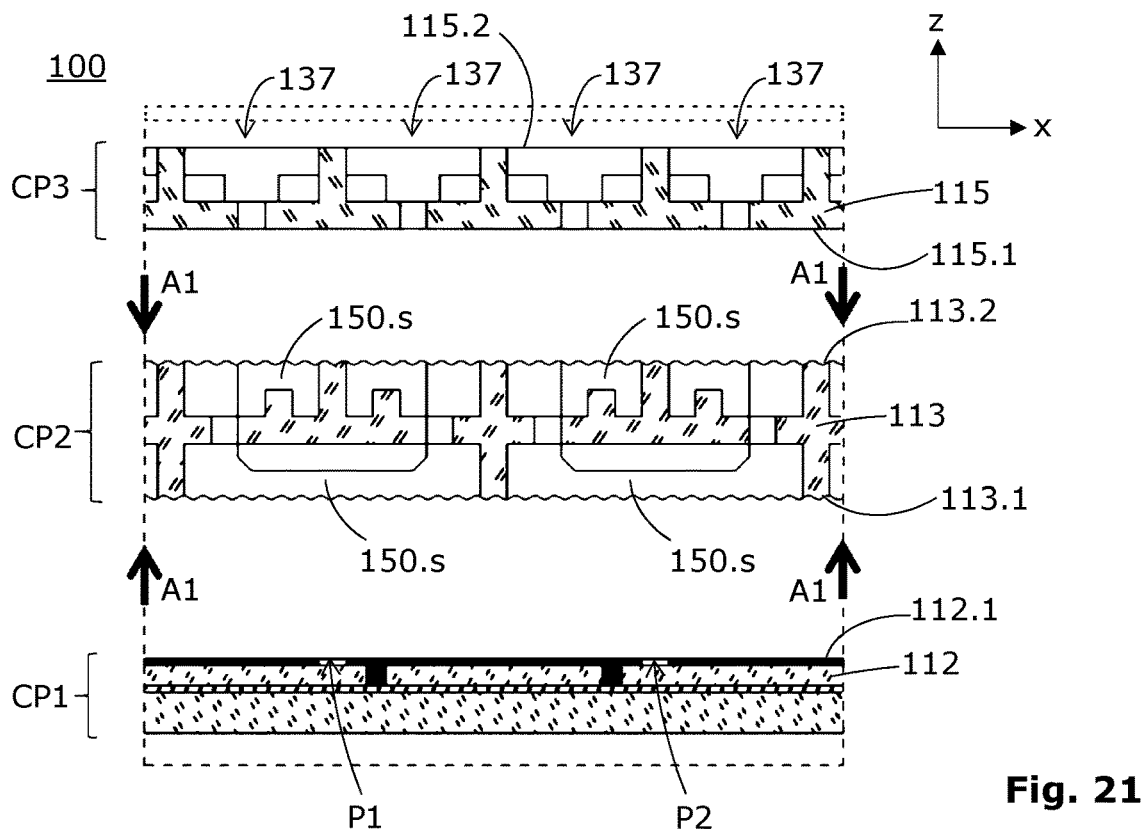
FIG. 21 schematically shows an exploded cross-section of an antenna embodiment comprising at least two injection molded layers and one metal layer.

As a final illustrated example, an eleventh embodiment has been depicted in FIG. 21, where bulk metal layer 112 of the ninth embodiment (c.f. FIG. 19) has been resembled by a SIW-bearing PCB. Two HF signal ports P1, P2 are provided at the ends of SIW ducts arriving from the left side and the right side, with wave propagation parallel to the x-y plane. These SIWs can be conveniently connected to microstrip lines on top of the PCB, which are a well-suited interface to active, e.g. eWLB-packaged high density microwave subsystems.

Further embodiments are possible by combining the layers 112, 113, 115 of the embodiments described so far. Such a further embodiment might comprise the following sequence of layers, for example:

first metal layer 112, first injection molded layer 113, second metal layer, second injection molded layer 115, or first injection molded layer 113, first metal layer 112, second injection molded layer 115, second metal layer.

All embodiments which have an injection molded layer 113 at the bottom of the layer stack, which is always closed on top by either a metal layer 112 or 121 (regardless, whether this metal layer provides for inter-stack couplings or direct radiation by slots) or is closed by another injection molded layer 115, can have integrated waveguide ducts, extending normal to the x-y-plane. The layers 113 providing a waveguide duct parallel to the z axis can be optionally closed on their lower surface 113.1 (c.f. FIG. 17) in order to provide a second independent or combined signal distribution network layer for signal routing purposes, with a metal layer 112 closed everywhere with exception of the port location, thereby freeing up valuable surface area for SMT component placement on the underlying system PCB. The lower surface around the HF-port P1 can provide a similar combination of deformable microstructures C1, limit stop structures C2 and 3D interlocking structures C3.i as inside the layer stack, for connecting/fixing of the complete antenna sandwich/subsystem to the system PCB, e.g. by using a specifically selected bonding agent which can be applied to fully populated (soldered) PCBs without risking defects or deterioration of quality, due to i. the much larger choice of low temperature curing grades of electrically isolating adhesives as compared to conductive compounds, and ii. avoiding risk of short-circuiting adjacent SMT circuitry by unintentional spreading and spill-over of uncured agent or silver migration during the finished product's operational life time.

Preferred embodiments of the apparatus 100 comprise deformable microstructures C1.i, limit stop structures C2.i, and 3-dimensional engaging structures C3.i. In these embodiments, the 3-dimensional engaging structures C3.i ensure the planar alignment of said first contact partner CP1 with respect to said second contact partner CP2.

In a preferred embodiment of the apparatus 100, the deformable microstructures C1.i together with the limit stop structures C2.i define the final (stable) orthogonal distance OD (cf. FIG. 1B) between the first contact partner CP1 and the second contact partner CP2.

In order to ensure reliable electrical contacts by virtue of the deformable microstructures C1.i, they should be dimensioned i. with sufficient diameter to obtain a complete mold cavity filling, despite the limited mold flow due to filling compounds (e.g. mineral particles and/or fibres)

ii. with small enough diameter in order to accommodate sufficient (e.g. pimple-) density in the contact zone (with a respective center distance of ca. $PB=\lambda_m/4$ or less)

iii. high enough to allow for enough "overtravel" when uniaxial pressure is applied during assembly, dependent on the macroscopic parts flatness and compliance, without risking to rip the metal coating 136 of injection molded parts 113, 115.

These criteria i.-iii. result in preferable base diameters of 75 to 150 μm and a total (undeformed) height of 50 to 100 μm, e.g. for automotive radar frequency band 76 GHz to 81 GHz.

Useful wall thickness values are between 0.3 mm and 0.8 mm, dependent on the melt viscosity of the synthetic material used for molding the piece-parts 113, 115. Therefore, limit stop structures C2.i need to be sufficiently narrow to be accommodated on top of such walls a, b, while leaving enough surface area to place a sufficient number of C1.i pimples per area (rule of thumb 250-1000 per square cm). The intended contact area of limit stop structures C2.i should be made 5 to 20 times larger than the total compressed contact area of microstructures C1.i. This can be either achieved by long topologies (straight, undulated or zig-zag line as visible in FIGS. 3A to 3F) or shorter (transverse or inclined), with a base width of less than 30% of the wall. Their height is selected i. to allow for enough bond-line thickness, for limiting the shear forces during temperature excursions (depending on bonding agent and coefficient of thermal expansion (CTE)-mismatch of piece-parts used, typically >20 μm and up to ca. 80 um) and ii. To achieve the desired microstructure deformation with selected C1.i dimensions.

3-dimensional engaging structures C3.1 used on longitudinal walls a, b need to be wide enough to limit mold compound fiber retention, and need to be long enough to achieve enough strength for shear force blocking. Preferably, their length is 1.5 to 2.5 times the width, and the height is chosen to just stretch the thickness of the contact partner. There is also an upper limit of C3.1 height. The height should be kept smaller than 4 to 5 time its width. A proper trade-off between C1.i density, C2.i surface area and height on one side, and the number and cross section of structures C3.i on the other side is quite involved and should be based on comprehensive RF performance and structural mechanical (FEM, Finite element method) stress analysis.

3-dimensional engaging structures C3.2 and C3.3 are being used at specific locations requiring highly accurate mutual alignment of contact partners (e.g. between radiator slots and cavities, or on the sides of a dimensionally critical waveguide coupling structure). Useful post diameters for this purpose are starting with ca. 1 mm and are virtually only limited by available space—provided that the wall thickness is controlled according to injection molding design rules, as e.g. visible in FIGS. 6A to 6D. The upper part of post C3.3 is slightly conical and provides self-locking inside 3D molded second contact partners. The effective diameter of trifold-circular symmetric alignment holes 118 (e.g. in a sheet metal 112), as well as the inner curvature (radius with respect to post radius) is dimensioned small enough to allow for enough radial compression forces to achieve the alignment under all practical conditions, while avoiding excessive metal abrasion and too much plastic deformation. A number of factors (base material hardness, metal adhesion limits etc.) need to be taken into account. Alignment holes in metal sheet need to have sufficiently rounded edges (fillets) as well.

3-dimensional engaging structure C3.4 dimensions are dictated by the cumulated diameter tolerances of locking hole in contact partner 112 (refer to FIG. 7) and expandable bolt outer diameter. The latter has an inner bore, which needs to be small enough to exert sufficient material displacement when inserting the (metal) pin 120, for obtaining a tight fit. Displacement cross-sectional area needs to be larger than annular gap area between expandable bolt and locking hole by factor of 2 . . . 4. Retaining force is limited by the wall thickness of the expandable bolt 119, which has a suitable range between 0.5 and 1 mm. Suitable pin diameters are 0.5 to 0.8 mm—a knurled pin 120 (as depicted in FIG. 7) is preferable for achieving instantaneous pin locking and—securing in injection molded layer 113.

While the above describes certain embodiments, those skilled in the art should understand that the foregoing description is not intended to limit the spirit or scope of the present disclosure. It should also be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure.

The invention claimed is:

1. An apparatus comprising:
   a first contact partner including
      a first metal contact surface;
   a 3-dimensional injection molded layer comprising a synthetic injection-moldable material and serving as a second contact partner, the second contact partner including
      a second metal contact surface comprising a plurality of deformable microstructures situated between said first contact partner and said second contact partner, said plurality of deformable microstructures serving as electric pressure contacts which electrically connect said first metal contact surface and said second metal contact surface after having assembled said first contact partner and said second contact partner; and
   an electrically isolating bonding agent comprising a polymeric material or a polymeric-based compound material, said bonding agent being situated between said first contact partner and said second contact partner.

2. The apparatus of claim 1, wherein said bonding agent, after it has been cured, does not show electrical direct current conductivity between opposed surfaces.

3. The apparatus of claim 1, wherein
   a metal layer, or
   a metal sheet, or
   a metal foil, or
   a bulk metal body, or
   a metallized printed circuit board
serves as the first contact partner, wherein
   said first metal contact surface is part of said metal layer, metal sheet, metal foil, bulk metal body, or metallized printed circuit board, and
   wherein said first contact partner comprises a 2D-structure extending through said metal layer, metal sheet, metal foil, bulk metal body or metallized printed circuit board.

4. The apparatus of claim 1, wherein a 3-dimensional injection molded layer,
   electroformed metal layer, or
   die-cast metal layer
serves as the first contact partner, wherein
   said first metal contact surface is part of said 3-dimensional injection molded layer or electroformed metal layer or die-cast metal layer, and
   wherein said first contact partner comprises
      through-holes or apertures providing for a signal coupling, or
      at least one slot-based radiator structure, or
      at least one antenna cavity.

5. The apparatus of claim 1, comprising a metal layer serving as a third contact partner, wherein said 3-dimensional injection molded layer is situated between said first contact partner and said third contact partner.

6. The apparatus of claim 5, comprising a further 3-dimensional injection molded layer serving as a fourth contact partner, wherein said metal layer is situated between said second contact partner and said fourth contact partner.

7. The apparatus of claim 1, comprising a further 3-dimensional injection molded layer serving as a third contact partner, wherein said 3-dimensional injection molded layer, which serves as the second contact partner, is situated between said first contact partner and said third contact partner.

8. The apparatus of claim 1, comprising a further 3-dimensional injection molded layer serving as a third contact partner, wherein said first contact partner is situated between said second contact partner and said third contact partner.

9. The apparatus of claim 1, wherein
   a metallization of at least one surface of said 3-dimensional injection molded layer serves as said second metal contact surface, and
   wherein said plurality of deformable microstructures are an integral part of said second metal contact surface.

10. The apparatus of claim 1, wherein said electrically isolating bonding agent is a low-temperature bonding agent which does not require a temperature beyond 150° C. during application and during a subsequent curing and/or hardening phase.

11. The apparatus of claim 1, wherein a 1-component agent with photo-induced curing mechanism serves as the electrically isolating bonding agent.

12. The apparatus of claim 1, wherein a 1-component agent with heat-induced curing mechanism serves as the electrically isolating bonding agent.

13. The apparatus of claim 1, wherein said electrically isolating bonding agent is an inkjet printable bonding agent which is designed for heat-induced curing and/or UV induced curing.

14. The apparatus of claim 1, further comprising between said first contact partner and said second contact partner
   limit stop structures defining a relative stop position when assembling said first contact partner and said second contact partner.

15. The apparatus of claim 14, wherein said deformable microstructures together with said limit stop structures define an orthogonal distance between said first contact partner and said second contact partner.

16. The apparatus of claim 1, wherein said deformable microstructures have a partial plastic deformability, so that during an assembly process where said first contact partner and said second contact partner are uniaxially pressed against each other, an uppermost portion of each of said deformable microstructures is plastically deformed to absorb mechanical layer tolerances, while keeping residual elastic compression force establishing said electric pressure contacts.

17. The apparatus of claim 1, further comprising between said first contact partner and said second contact partner
3-dimensional engaging structures comprising first portions being situated on or in said first contact partner and second portions being situated on or in said second contact partner, wherein said first portions engage with said second portions when assembling said first contact partner and said second contact partner.

18. The apparatus of claim 1, wherein said 3-dimensional injection molded layer comprises at least one hollow waveguide or one of two flat or corrugated electrically conductive surfaces which constitute a waveguide duct when assembled.

19. The apparatus of claim 1, further comprising at least a second 3-dimensional injection molded layer serving as third contact partner being positioned above or below said second contact partner, and wherein said second contact partner together with said third contact partner define at least one hollow waveguide.

20. The apparatus of claim 1, wherein a metal layer is provided which comprises at least one slot or aperture being designed for transmitting/receiving microwaves.

21. The apparatus of claim 1, comprising at least one 3-dimensional injection molded layer with at least one antenna cavity being designed for transmitting/receiving microwaves.

22. The apparatus of claim 1, wherein
said 3-dimensional injection molded layer, which serves as second contact partner, comprises at least one signal routing waveguide being defined by corrugations of the first metal contact surface of said 3-dimensional injection molded layer,
said first metal contact surface of said first contact partner at least partially covers the first metal contact surface, and
said 3-dimensional injection molded layer comprises at least a second signal routing waveguide being defined by corrugations of its second metal contact surface,
and wherein said apparatus further comprises:
a further metal layer serving as third contact partner, wherein a first metal contact surface of said third contact partner at least partially covers the second metal contact surface of said 3-dimensional injection molded layer and wherein said third contact partner comprises at least one radiating aperture, and
a signal processing apparatus,
wherein said at least one signal routing waveguide provides for a signal connection between the at least one radiating aperture of said third contact partner and said signal processing apparatus through the body of said 3-dimensional injection molded layer.

23. The apparatus of claim 1 comprising limit stop structures and 3-dimensional engaging structures, wherein said 3-dimensional engaging structures ensure a planar alignment of said first contact partner with respect to said second contact partner.

24. A radar apparatus comprising an apparatus according to claim 1 and further comprising at least one radar integrated circuit for generating a radar signal and/or for processing a received radar signal, and wherein
said 3-dimensional injection molded layer or a further 3-dimensional injection molded layer provides signal interconnect functions for routing radar signals between said radar integrated circuit and one or more waveguide ducts defined by at least two adjacent layers of apparatus, and
said 3-dimensional injection molded layer or a further 3-dimensional injection molded layer or an electroformed layer or a die-cast layer, or a further metal layer provides for radiation and reception functions.

25. The radar apparatus of claim 24, wherein said 3-dimensional injection molded layer comprises a multichannel feeding network with signal underpasses and crossings.

26. A method for assembling at least a first contact partner and a second contact partner of a microwave apparatus comprising the steps:
providing a first contact partner which has a first metal contact surface,
providing a 3-dimensional injection molded layer serving as second contact partner which has a second metal contact surface, which comprises a synthetic injection-moldable material, and which comprises a plurality of deformable microstructures,
applying a bonding agent to said first metal contact surface and/or to said second metal contact surface,
joining the first contact partner and the second contact partner so that said first metal contact surface is oriented essentially parallel to said second metal contact surface,
applying an uniaxial force in order to press said first metal contact surface against said second metal contact surface while said bonding agent is caused to cure or harden,
wherein an electrically isolating bonding agent comprising a polymeric material or a polymeric-based compound material, serves as bonding agent.

27. The method of claim 26, wherein said bonding agent is caused to cure or harden by an exposure to UV-light and/or by a temporary temperature increase.

* * * * *